US012313643B2

(12) United States Patent
Sattler

(10) Patent No.: US 12,313,643 B2
(45) Date of Patent: May 27, 2025

(54) REAGENT DRAWER AND ASSOCIATED DETECTOR MOUNTED TO A SLIDER CAPABLE OF EXTENDING FROM AN AUTOMATIC ANALYZER HOUSING

(71) Applicant: Roche Diagnostics Operations, Inc., Indianapolis, IN (US)

(72) Inventor: Stephan Sattler, Starnberg (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 791 days.

(21) Appl. No.: 17/453,406

(22) Filed: Nov. 3, 2021

(65) Prior Publication Data

US 2022/0057421 A1 Feb. 24, 2022

Related U.S. Application Data

(63) Continuation of application No. PCT/US2020/064653, filed on May 27, 2020.

(30) Foreign Application Priority Data

May 28, 2019 (EP) .................................... 19177047

(51) Int. Cl.
*G01N 35/00* (2006.01)
*G01N 35/10* (2006.01)

(52) U.S. Cl.
CPC ... *G01N 35/1002* (2013.01); *G01N 35/00732* (2013.01); *G01N 2035/00742* (2013.01)

(58) Field of Classification Search
CPC ......... G01N 35/1002; G01N 35/00732; G01N 2035/00742; G01N 2035/00435; G01N 2035/00673; G01N 2035/00443

(Continued)

(56) References Cited

U.S. PATENT DOCUMENTS 5,578,269 A * 11/1996 Yaremko .............. G01N 35/025
422/65
5,620,898 A * 4/1997 Yaremko .............. G01N 35/025
422/63

(Continued)

FOREIGN PATENT DOCUMENTS

EP 0628822 A2 12/1994
EP 3109641 A1 12/2016

(Continued)

OTHER PUBLICATIONS

Office Action; Japanese Patent Office; Japanese Application No. 2021-569048; Oct. 19, 2023; 3 pages.

(Continued)

*Primary Examiner* — Arlen Soderquist
(74) *Attorney, Agent, or Firm* — Taft Stettinius & Hollister LLP

(57) ABSTRACT

An automatic analyzer for analyzing samples is disclosed. The automatic analyzer comprises a housing at least partially enclosing at least one analyzing instrument, a drawer configured to be loaded with a plurality of reagent vessels, wherein the drawer is moveable in a longitudinal direction relative to the housing between a retracted position, in which the drawer is retracted in the housing, and extended positions, in which the drawer is extended from the housing, wherein the drawer defines arrangement positions for the reagent vessels at least in a first row parallel to the longitudinal direction, and a first detector associated with the first row and configured to identify the reagent vessels at a first detection position when arranged in the first row.

14 Claims, 20 Drawing Sheets

(58) Field of Classification Search
USPC .................................. 422/63–67; 436/43–54
See application file for complete search history.

(56) References Cited

U.S. PATENT DOCUMENTS

| | | | |
|---|---|---|---|
| 5,672,317 A * | 9/1997 | Buhler | G01N 35/026 |
| | | | 422/65 |
| 2001/0019826 A1* | 9/2001 | Ammann | B01F 29/10 |
| | | | 435/6.11 |
| 2004/0033163 A1* | 2/2004 | Tseung | B65D 1/0223 |
| | | | 422/63 |
| 2004/0134750 A1* | 7/2004 | Luoma, II | G01N 35/0099 |
| | | | 198/340 |
| 2005/0175504 A1* | 8/2005 | Tanoshima | G01N 35/0099 |
| | | | 422/67 |
| 2006/0148063 A1* | 7/2006 | Fauzzi | G01N 1/31 |
| | | | 422/65 |
| 2010/0292829 A1* | 11/2010 | Guzman | B01L 9/06 |
| | | | 414/800 |
| 2011/0115610 A1 | 5/2011 | Hughes | |
| 2011/0158865 A1* | 6/2011 | Miller | G01N 35/1002 |
| | | | 141/1 |
| 2014/0170636 A1* | 6/2014 | Bucher | G01N 35/025 |
| | | | 436/48 |
| 2014/0286124 A1* | 9/2014 | Donohue | B01L 9/50 |
| | | | 366/342 |
| 2017/0023561 A1* | 1/2017 | Martinell Gispert-Sauch | |
| | | | G01N 35/00029 |
| 2017/0153260 A1 | 6/2017 | Barmettler et al. | |
| 2017/0235984 A1* | 8/2017 | Opalsky | G06K 7/10732 |
| 2017/0269114 A1* | 9/2017 | Bryant | G01N 35/0099 |
| 2018/0292126 A1* | 10/2018 | Meyer | F25D 31/006 |
| 2019/0041412 A1* | 2/2019 | Tsujimura | G01N 35/026 |
| 2019/0195902 A1* | 6/2019 | Iwasaki | G01N 35/0099 |
| 2020/0225252 A1* | 7/2020 | Endo | B01L 9/06 |

FOREIGN PATENT DOCUMENTS

| | | | | |
|---|---|---|---|---|
| EP | 3422016 A1 | 1/2019 | | |
| GB | 2534844 A | 8/2016 | | |
| JP | H07-18266 U | 3/1995 | | |
| JP | 2006230295 A | 9/2006 | | |
| JP | 2007018266 A | 1/2007 | | |
| JP | 2008285859 A | 11/2008 | | |
| JP | 2015200668 A | 11/2015 | | |
| JP | 2016057316 A | 4/2016 | | |
| JP | 2016513260 A | 5/2016 | | |
| JP | 2018058801 A | 4/2018 | | |
| JP | 2018059801 A | 4/2018 | | |
| WO | WO-2014001530 A1 * | 1/2014 | | G01N 1/312 |

OTHER PUBLICATIONS

Office Action; Japanese Patent Office; Japanese Application No. 2021-569048; Mar. 4, 2024; 3 pages.

International Search Report issued Aug. 27, 2020, in Application No. PCT/EP2020/064653, 3 pp.

Written Opinion of the International Searching Authority; European Patent Office; International Application No. PCT/EP2020/064653; Aug. 27, 2020; 7 pages.

International Preliminary Report on Patentability; The International Bureau of WIPO; International Application No. PCT/EP2020/064653; Nov. 16, 2021; 8 pages.

* cited by examiner

REAGENT DRAWER AND ASSOCIATED DETECTOR MOUNTED TO A SLIDER CAPABLE OF EXTENDING FROM AN AUTOMATIC ANALYZER HOUSING

CROSS-REFERENCE TO RELATED APPLICATIONS

This application is a continuation of International Patent Application No. PCT/EP2020/064653, filed 27 May 2020, which claims priority to European Patent Application No. 19177047.8, filed 28 May 2019, the disclosures of which are hereby incorporated by reference in their entirety.

TECHNICAL FIELD

The present disclosure relates to an automatic analyzer using disposable parts used in contact with samples.

BACKGROUND

In vitro diagnostic testing has a major effect on clinical decisions, providing physicians with pivotal information. Particularly, there is great emphasis on providing quick and accurate test results in critical care settings. In vitro diagnostic testing is usually performed using instruments operable to execute one or more processing steps or workflow steps on one or more biological samples and/or one or more reagents, such as pre-analytical instruments, post-analytical instruments, and analytical instruments.

Analytical instruments or analyzers are configured to obtain a measurement value. An analyzer is operable to determine via various chemical, biological, physical, optical or other technical procedures, a parameter value of the sample, or a component thereof. An analyzer may be operable to measure said parameter of the sample or of at least one analyte and return the obtained measurement value. The list of possible analysis results returned by the analyzer comprises, without limitation, concentrations of the analyte in the sample, a digital (yes or no) result indicating the existence of the analyte in the sample (corresponding to a concentration above the detection level), optical parameters, DNA or RNA sequences, data obtained from mass spectroscopy of proteins or metabolites, and physical or chemical parameters of various types. An analytical instrument may comprise units assisting with the pipetting, dosing, and mixing of samples and/or reagents.

The analyzer may comprise a reagent holding unit for holding reagents to perform the assays. Reagents may be arranged for example in the form of vessels, containers or cassettes containing individual reagents or group of reagents, placed in appropriate receptacles or positions within a storage compartment or conveyor. It may comprise a consumable feeding unit. The analyzer may comprise a process and detection system whose workflow is optimized for certain types of analysis. Examples of such analyzers are clinical chemistry analyzers, coagulation chemistry analyzers, immunochemistry analyzers, urine analyzers, and nucleic acid analyzers, used to detect the result of chemical or biological reactions or to monitor the progress of chemical or biological reactions.

Such automatic analyzers allow to increase the number of analytical processes and obtainable measurements values. For this reason, such automatic analyzers use several reagents provided in reagent vessels at the same time. For example, 6 to 8 different reagents are used with such an automatic analyzer. In order to ensure that the correct reagent is supplied to the automatic analyzer for its target analytical process, it is necessary to identify the reagent and to ensure that the respective reagent vessel is at its target position. Basically, it was possible to use one detector per reagent vessel for identification of the reagent included therein. However, this approach would significantly increase the number of detectors and, therefore, the costs for automatic analyzer that, in practice, is not feasible for economic reasons.

SUMMARY

Although the embodiments of the present disclosure are not limited to specific advantages or functionality, it is noted that in accordance with the present disclosure a laboratory sample distribution system and a laboratory automation system are provided that reduce the transfer of heat generated by the electromagnetic actuators towards the container carriers.

Embodiments of the disclosed automatic analyzer aim to reduce the number of detectors necessary to identify the reagent vessels and, thus, the reagents, supplied to the automatic analyzer.

In accordance with one embodiment of the disclosure, an automatic analyzer for analyzing samples is provided, comprising: a housing at least partially enclosing at least one analyzing instrument, a drawer configured to be loaded with a plurality of reagent vessels, wherein the drawer is moveable in a longitudinal direction relative to the housing between a retracted position, in which the drawer is retracted in the housing, and extended positions, in which the drawer is extended from the housing, wherein the drawer defines arrangement positions for the reagent vessels at least in a first row parallel to the longitudinal direction, and a first detector associated with the first row and configured to identify the reagent vessels at a first detection position when arranged in the first row, and wherein the automatic analyzer further comprises a first slider, wherein the first detector is mounted to the first slider, wherein the first slider is moveable between a slider retracted position, in which the first slider is retracted in the housing, and a slider extended position, in which the first slider is extended at a proximal position from the housing.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

Further optional features and embodiments will be disclosed in more detail in the subsequent description of embodiments, typically in conjunction with the dependent claims. Therein, the respective optional features may be realized in an isolated fashion as well as in any arbitrary feasible combination, as the skilled person will realize. The scope of the present disclosure is not restricted by the typical embodiments. The embodiments are schematically depicted in the figures. Therein, identical reference numbers in these figures refer to identical or functionally comparable elements.

The following detailed description of the embodiments of the present description can be best understood when read in conjunction with the following drawings, where like structure is indicated with like reference numerals and in which.

Figure 1:
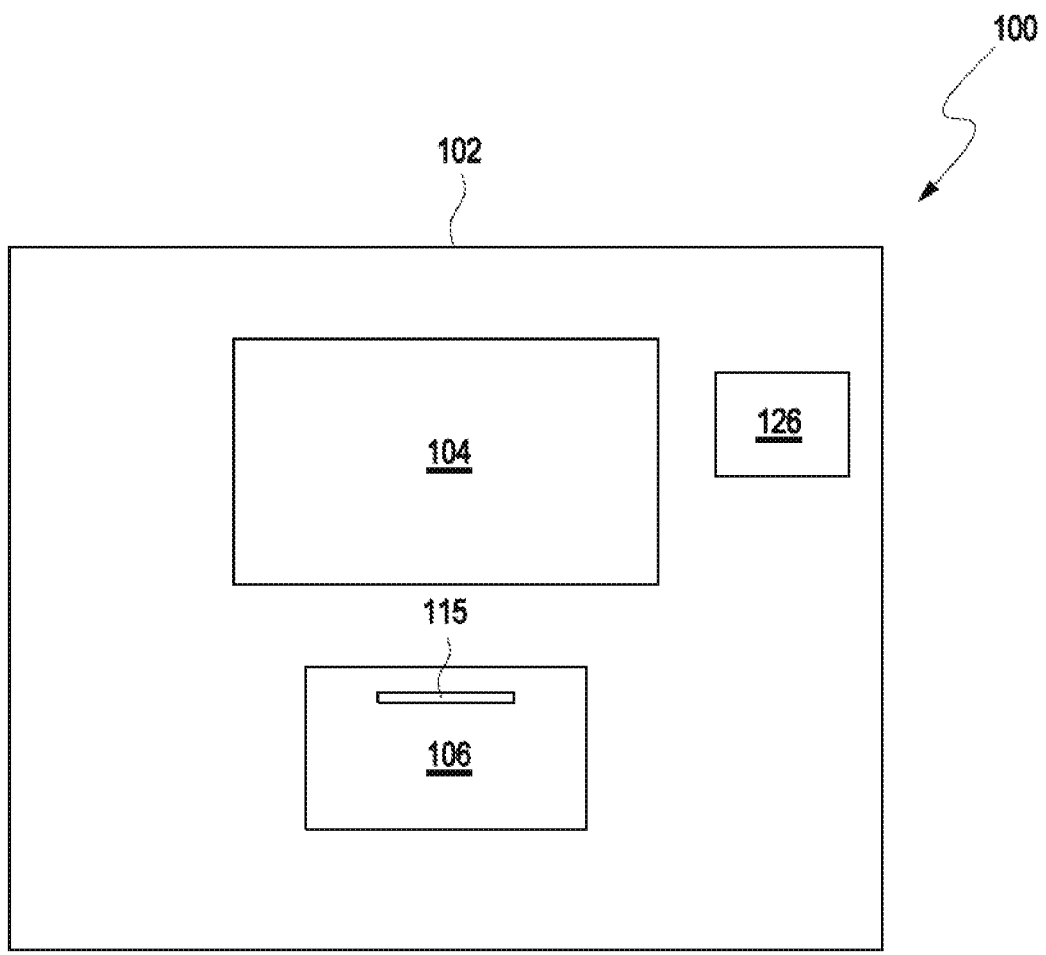
FIG. 1 shows a schematical illustration of an automatic analyzer 100 in accordance with an embodiment of the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D, or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, notwithstanding the fact that the respective feature or element may be present once or more than once.

Further, as used in the following, the terms "typically", "more typically", "particularly", "more particularly", "specifically", "more specifically" or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the present disclosure" or similar expressions are intended to be optional features, without any restriction regarding alternative embodiments of the present disclosure, without any restrictions regarding the scope of the present disclosure and without any restriction regarding the possibility of combining the features introduced in such way with other optional or non-optional features of the present disclosure.

The term "automatic analyzer" as used herein is a broad term and is to be given its ordinary and customary meaning to a person of ordinary skill in the art, and is not to be limited to a special or customized meaning. The term specifically may refer, without limitation, to any apparatus or apparatus component operable to execute one or more processing steps/workflow steps on one or more biological samples and/or reagents. The term "processing step" thereby refers to physically executed processing steps such as centrifugation, aliquotation, sample analysis and the like. The term "analyzer" covers pre-analytical sample work-cells, post-analytical sample work-cells, and analytical work-cells.

The term "reagent vessel" as used herein is a broad term and is to be given its ordinary and customary meaning to a person of ordinary skill in the art, and is not to be limited to a special or customized meaning. The term specifically may refer, without limitation, to any container configured to store a reagent. Examples for such reagent vessels are bottles, cans, canisters and jerry cans.

The term "identify a reagent vessel" or "identification of a reagent vessel" as used herein is a broad term and is to be given its ordinary and customary meaning to a person of ordinary skill in the art, and is not to be limited to a special or customized meaning. The term specifically may refer, without limitation, not only the pure presence of a reagent vessel but the identification of the type reagent vessel including the contents thereof such as the type of reagent included in the reagent vessel.

According to the disclosed automatic analyzer, the automatic analyzer comprises a housing at least partially enclosing at least one analyzing instrument. Thus, the constructional members necessary for carrying out the analytics or analytical processes are safely accommodated and protected from external influence. The automatic analyzer further comprises a drawer configured to be loaded with a plurality of reagent vessels. Thus, the analytical instruments may be supplied with a plurality of different reagents so as to carry out several different analytical processes. The drawer is moveable in a longitudinal direction relative to the housing between a retracted position, in which the drawer is retracted in the housing, and extended positions, in which the drawer is extended from the housing. Thus, the drawer is moveable in a rather simple manner from a position within the housing to several different positions outside from the housing. The drawer defines arrangement positions for the reagent vessels at least in a first row parallel to the longitudinal direction. Thus, the reagent vessels may be arranged within the drawer in a row, which facilitates the loading process, as the drawer is moveable in the same direction. The automatic analyzer further comprises a first detector associated with the first row and configured to identify the reagent vessels at a first detection position when arranged in the first row. Thus, a single detector is sufficient to identify all of the reagent vessels provided in the first row independent on the number of reagent vessels included in this row as the reagent vessels need to pass the first detection position. Thereby, the costs for the identification process are significantly reduced.

The drawer may be moveable in predetermined steps into the extended positions corresponding to the arrangement positions. Thus, it is ensured that the extended positions match the arrangement position, which facilitates the loading of the reagent vessels.

The automatic analyzer may further comprise halts, particularly latches, configured to halt the drawer in each of the extended positions. Thus, an undesired shifting of the drawer may be reliably prevented which also prevents a reagent vessel from being loaded into an incorrect position.

The automatic analyzer may further comprise a first slider, wherein the first detector may be mounted to the first slider, wherein the first slider may be moveable between a slider retracted position, in which the first slider is retracted in the housing, and a slider extended position, in which the first slider is extended at a proximal position from the housing. Thus, first detector is moved to an extended position when the first slider is moved out of the housing.

The first slider may be biased towards the slider retracted position. Thus, it is ensured that the first slider including the first detector is moved into a position within the housing such that the first detector may be protected.

A movement of the first slider may be partially coupled to a movement of the drawer. Thus, the drawer and the first slider are concertedly moved such that the slider does not need to be moved separately from the drawer. Thus, a separate drive for moving the first slider may be omitted.

The first detector may be triggered when the first slider is moved to the slider extended position, or when a reagent vessel is loaded into the drawer in the first row, or when a reagent vessel is unloaded from the first row of the drawer. Thus, a permanent operation of the first detector may be avoided and the first detector only operates when triggered.

The slider extended position may overlap with the first detection position. Thus, it is ensured that the first detector is moved to the correct detection position.

The automatic analyzer may further comprise a switch, a sensor, or light barrier configured to trigger the first detector. Thus, it is ensured that the first detector is only operated when necessary.

The drawer may comprise an inclined inner surface on which the reagent vessels are loadable. Thus, a clearance or dead space volume may be reduced as the liquid reagent may be better discharged from the reagent vessels.

The automatic analyzer may further comprise a position sensor configured to detect a position of the drawer. Thus, a premature operation of the analytical process may be prevented as it may be detected whether the drawer is in the retracted position or not.

Alternatively, the first detector may be configured to detect a position of the drawer. Thus, a premature operation of the analytical process may be prevented as it may be detected whether the drawer is in the retracted position or not.

The first detector may be configured to detect a moving direction of the drawer. Thus, it can be detected whether the drawer is inserted into the housing or is extended from the housing. Thereby, it can be detected whether the drawer is ready to be loaded or has been loaded with reagent bottles and is ready to be inserted into the housing for starting the analytical process.

The first detector may be configured to detect the moving direction of the drawer by means of position markers arranged between the arrangement positions. Thus, depending on which of the position markers pass the first detector, the moving direction may be detected in a rather simple manner. The detection of the moving direction may be further improved by means of the provision of a damping device associated with the drawer. Such a damping device is configured to smoothen the movement of the drawer and to prevent an abrupt variation of the moving direction. Applicable damping devices are known to the skilled person and are for example a gear rack, a gear wheel, a flywheel mass, and oil-based dampers.

The first detector is typically a RFID reader configured to identify the reagent vessels by means of a RFID tag attached to an outer surface of each reagent vessel in the first row. Thus, a well-established type of detectors may be used to identify the reagent vessels. Alternatively, any kind of detector may be used such as a bar code reader detecting a bar code attached to an outer surface of each reagent vessel in the first row.

The first detector may be arranged below or laterally next to the drawer. Thus, the first detector may be arranged in a space saving manner.

The automatic analyzer may further comprise a display device configured to display at least one of the following detection results from the first detector: no reagent vessel at an arrangement position defined by or matching with the first detection position, a wrong reagent vessel at an arrangement position defined by or matching with the first detection position, and a correct reagent vessel at an arrangement position or matching with defined by the first detection position. Thus, the operator of the automatic analyzer may be well informed on the status of the reagent vessels.

The drawer may further define arrangement positions for the reagent vessels at least in a second row parallel to the longitudinal direction, wherein the automatic analyzer may further comprise a second detector associated with the second row and configured to identify the reagent vessels at a second detection position when arranged in the second row. Thus, independent of the number of reagent vessels in the respective rows, a single detector per row is sufficient for identifying all of the reagent vessels in the rows.

The automatic analyzer may further comprise a second slider, wherein the second detector may be mounted to the second slider, wherein the second slider may be moveable between a slider retracted position, in which the second slider is retracted in the housing, and a slider extended position, in which the second slider is extended at a proximal position from the housing. Thus, second detector is moved to an extended position when the second slider is moved out of the housing.

The second slider may be biased towards the slider retracted position. Thus, it is ensured that the second slider including the second detector is moved into a position within the housing such that the second detector may be protected.

A movement of the second slider may be partially coupled to a movement of the drawer. Thus, a separate drive for moving the second slider may be omitted.

The second detector may be triggered when the second slider is moved to the slider extended position or when a reagent vessel is loaded into the drawer in the second row or when a reagent vessel is unloaded from the second row of the drawer. Thus, a permanent operation of the second detector may be avoided and the first detector only operates when triggered.

The first and second sliders may be connected to one another or integrally formed. Thus, the number of constructional members may be reduced. Particularly, the first and second sliders may be designed as a single slider on which the first and second detectors may be mounted.

The automatic analyzer may further comprise a switch, a sensor, or light barrier configured to trigger the second detector. Thus, it is ensured that the second detector is only operated when necessary.

The second detector is configured to detect a position of the drawer. Thus, a premature operation of the analytical process may be prevented as it may be detected whether the drawer is in the retracted position or not.

The second detector may be configured to detect a moving direction of the drawer. Thus, it can be detected whether the drawer is inserted into the housing or is extended from the housing. Thereby, it can be detected whether the drawer is ready to be loaded or has been loaded with reagent bottles and is ready to be inserted into the housing for starting the analytical process.

The second detector may be configured to detect the moving direction of the drawer by means of position markers arranged between the arrangement positions. Thus, depending on which of the position markers pass the second detector, the moving direction may be detected in a rather simple manner.

The second detector is typically a RFID reader configured to identify the reagent vessels by means of a RFID tag attached to an outer surface of each reagent vessel in the second row. Thus, a well-established type of detectors may be used to identify the reagent vessels. Alternatively, any kind of detector may be used such as a bar code reader detecting a bar code attached to an outer surface of each reagent vessel in the second row.

The second detector may be arranged below or laterally next to the drawer. Thus, the second detector may be arranged in a space saving manner.

The automatic analyzer may further comprise a display device configured to display at least one of the following detection results from the second detector: no reagent vessel at an arrangement position defined by or matching with the second detection position, a wrong reagent vessel at an arrangement position defined by or matching with the second detection position, and a correct reagent vessel at an arrangement position defined by or matching with the second detection position. Thus, the operator of the automatic analyzer may be well informed on the status of the reagent vessels.

The arrangement positions of the second row may be shifted relative to the arrangement postilions of the first row in the longitudinal direction. Thus, the width of the drawer may be reduced.

The automatic analyzer may further comprise discharge devices configured to discharge reagent from the reagent vessels, wherein each of the discharge devices comprises an immersion tube configured to be immersed into a reagent vessel. Thus, the liquid reagent may be discharged from the reagent vessels by sucking the same through the immersion tube.

The immersion tube may be formed straight and the discharge device may be linearly moveable between an open position, in which the immersion tube is retracted from a reagent vessel, and a closed position, in which the immersion tube is immersed into the reagent vessel. Thus, by means of raising and lowering of the discharge device, the immersion tube is retracted from and inserted into the reagent vessel.

Alternatively, the immersion tube may be curved and the discharge device is pivotally moveable between an open position, in which the immersion tube is retracted from a reagent vessel, and a closed position, in which the immersion tube is immersed into the reagent vessel. This design reduces the space for the discharge device and requires a simple drive if compared with a linear drive.

The automatic analyzer may further comprise a blocking device configured to allow a reagent vessel to be loaded into or to be unloaded from the drawer exclusively in a first extended position of the drawer proximal to the housing. Thus, only in the first extended position a loading or unloading of a reagent vessel is possible and the identity of the reagent vessel may be detected at the same time.

The blocking device may be coupled to the discharge devices. Thus, a movement of the discharge device may be selectively blocked.

The blocking device may be configured to block a movement of the discharge devices at least from the open position into the closed position if a wrong reagent vessel is detected and to allow a movement of the discharge device at least from the open position into the closed position if a correct reagent vessel is detected. Thus, a movement of the discharge devices is only allowed in the first extended position such that a replacement of a wrong reagent vessel is reliably prevented.

The blocking device may be configured to block a movement of the discharge device at least from the closed position into the open position if an associated reagent vessel is not completed discharged. Thus, a premature replacement of a reagent vessel is prevented such that a waste of the reagent is prevented.

The blocking device may be configured to prevent a reagent vessel to be loaded into or to be unloaded from the drawer in any extended position except for the first extended position of the drawer proximal to the housing. Thus, a replacement of a reagent vessel is possible only in the first extended position and any other reagent vessels are blocked from being replaced. Thus, a replacement of a wrong reagent vessel is reliably prevented.

The automatic analyzer blocking device may be configured to block a movement of the discharge devices associated with any extended position except for the first extended position at least from the closed position into the open position. Thus, only the discharge device associated with the first extended position may be moved and any other discharge devices are blocked from being moved. Thus, a replacement of a wrong reagent vessel is reliably prevented.

Further disclosed and proposed herein is a computer program including computer-executable instructions for performing the method according to the present disclosure in one or more of the embodiments enclosed herein when the program is executed on a computer or computer network. Specifically, the computer program may be stored on a computer-readable data carrier. Thus, specifically, one, more than one or even all of method steps a) to d) as indicated above may be performed by using a computer or a computer network, typically by using a computer program.

Further disclosed and proposed herein is a computer program product having program code means, in order to perform the method according to the present disclosure in one or more of the embodiments enclosed herein when the program is executed on a computer or computer network. Specifically, the program code means may be stored on a computer-readable data carrier.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Finally, disclosed and proposed herein is a modulated data signal that contains instructions readable by a computer system or computer network, for performing the method according to one or more of the embodiments disclosed herein.

Referring to the computer-implemented aspects of the present disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:
- a computer or computer network comprising at least one processor, wherein the processor is adapted to perform the method according to one of the embodiments described in this description,
- a computer loadable data structure that is adapted to perform the method according to one of the embodiments described in this description while the data structure is being executed on a computer,
- a computer program, wherein the computer program is adapted to perform the method according to one of the embodiments described in this description while the program is being executed on a computer,
- a computer program comprising program means for performing the method according to one of the embodiments described in this description while the computer program is being executed on a computer or on a computer network,
- a computer program comprising program means according to the preceding embodiment, wherein the program means are stored on a storage medium readable to a computer,
- a storage medium, wherein a data structure is stored on the storage medium and wherein the data structure is adapted to perform the method according to one of the embodiments described in this description after having been loaded into a main and/or working storage of a computer or of a computer network, and
- a computer program product having program code means, wherein the program code means can be stored or are stored on a storage medium, for performing the method according to one of the embodiments described in this description, if the program code means are executed on a computer or on a computer network.

Summarizing and without excluding further possible embodiments, the following embodiments may be envisaged:

Embodiment 1: An automatic analyzer for analyzing samples, comprising:
- a housing at least partially enclosing at least one analyzing instrument,
- a drawer configured to be loaded with a plurality of reagent vessels, wherein the drawer is moveable in a longitudinal direction relative to the housing between a retracted position, in which the drawer is retracted in the housing, and extended positions, in which the drawer is extended from the housing, wherein the drawer defines arrangement positions for the reagent vessels at least in a first row parallel to the longitudinal direction; and
- a first detector associated with the first row and configured to identify the reagent vessels at a first detection position when arranged in the first row.

Embodiment 2: The automatic analyzer according to the preceding embodiment, wherein the drawer is moveable in predetermined steps into the extended positions corresponding to the arrangement positions.

Embodiment 3: The automatic analyzer according to the preceding embodiment, further comprising halts, particularly latches, configured to halt the drawer in each of the extended positions.

Embodiment 4: The automatic analyzer according to any preceding embodiment, further comprising a first slider, wherein the first detector is mounted to the first slider, wherein the first slider is moveable between a slider retracted position, in which the first slider is retracted in the housing, and a slider extended position, in which the first slider is extended at a proximal position from the housing.

Embodiment 5: The automatic analyzer according to the preceding embodiment, wherein the first slider is biased towards the slider retracted position.

Embodiment 6: The automatic analyzer according to any of the two preceding embodiments, wherein a movement of the first slider is coupled to a movement of the drawer.

Embodiment 7: The automatic analyzer according to any of the three preceding embodiments, wherein the first detector is triggered when the first slider is moved to the slider extended position or when a reagent vessel is loaded into the drawer in the first row or when a reagent vessel is unloaded from the first row of the drawer.

Embodiment 8: The automatic analyzer according to the preceding embodiment, wherein the slider extended position overlaps with the first detection position.

Embodiment 9: The automatic analyzer according to any preceding embodiment, further comprising a switch, a sensor, or light barrier configured to trigger the first detector.

Embodiment 10: The automatic analyzer according to any preceding embodiment, wherein the drawer comprises an inclined inner surface on which the reagent vessels are loadable.

Embodiment 11: The automatic analyzer according to any preceding embodiment, further comprising a position sensor configured to detect a position of the drawer.

Embodiment 12: The automatic analyzer according to any preceding embodiment, wherein the first detector is configured to detect a position of the drawer.

Embodiment 13: The automatic analyzer according to any preceding embodiment, wherein the first detector is configured to detect a moving direction of the drawer.

Embodiment 14: The automatic analyzer according to any preceding embodiment, wherein the first detector is configured to detect the moving direction of the drawer by means of position markers arranged between the arrangement positions.

Embodiment 15: The automatic analyzer according to any preceding embodiment, wherein the first detector is a RFID reader configured to identify the reagent vessels by means of a RFID tag attached to an outer surface of each reagent vessel in the first row.

Embodiment 16: The automatic analyzer according to any preceding embodiment, wherein the first detector is arranged below or laterally next to the drawer.

Embodiment 17: The automatic analyzer according to any preceding embodiment, further comprising a display device configured to display at least one of the following detection results from the first detector: no reagent vessel at an arrangement position defined by or matching with the first detection position, a wrong reagent vessel at an arrangement position defined by or matching with the first detection position, and a correct reagent vessel at an arrangement position defined by or matching with the first detection position.

Embodiment 18: The automatic analyzer according to any preceding embodiment, wherein the drawer further defines arrangement positions for the reagent vessels at least in a second row parallel to the longitudinal direction, wherein the automatic analyzer further comprises a second detector associated with the second row and configured to identify the reagent vessels at a second detection position when arranged in the second row.

Embodiment 19: The automatic analyzer according to any preceding embodiment, further comprising a second slider, wherein the second detector is mounted to the second slider, wherein the second slider is moveable between a slider retracted position, in which the second slider is retracted in the housing, and a slider extended position, in which the second slider is extended at a proximal position from the housing.

Embodiment 20: The automatic analyzer according to the preceding embodiment, wherein the second slider is biased towards the slider retracted position.

Embodiment 21: The automatic analyzer according to any of the two preceding embodiments, wherein a movement of the second slider is coupled to a movement of the drawer.

Embodiment 22: The automatic analyzer according to any of the three preceding embodiments, wherein the second detector is triggered when the second slider is moved to the slider extended position or when a reagent vessel is loaded into the drawer in the second row or when a reagent vessel is unloaded from the second row of the drawer.

Embodiment 23: The automatic analyzer according to any of the four preceding embodiments, wherein the first and second sliders are connected to one another or integrally formed.

Embodiment 24: The automatic analyzer according to any of the five preceding embodiments, further comprising a switch, a sensor, or light barrier configured to trigger the second detector.

Embodiment 25: The automatic analyzer according to any of the six preceding embodiments, wherein the second detector is configured to detect a position of the drawer.

Embodiment 26: The automatic analyzer according to any of the seven preceding embodiments, wherein the second detector is configured to detect a moving direction of the drawer.

Embodiment 27: The automatic analyzer according to any of the eight preceding embodiments, wherein the second detector is configured to detect the moving direction of the drawer by means of position markers arranged between the arrangement positions.

Embodiment 28: The automatic analyzer according to any of the nine preceding embodiments, wherein the second detector is a RFID reader configured to identify the reagent vessels by means of a RFID tag attached to an outer surface of each reagent vessel in the second row.

Embodiment 29: The automatic analyzer according to any of the ten preceding embodiments, wherein the second detector is arranged below or laterally next to the drawer.

Embodiment 30: The automatic analyzer according to any of the eleven preceding embodiments, further comprising a display device configured to display at least one of the following detection results from the second detector: no reagent vessel at an arrangement position defined by or matching with the second detection position, a wrong reagent vessel at an arrangement position defined by the second detection position, and a correct reagent vessel at an arrangement position defined by or matching with the second detection position.

Embodiment 31: The automatic analyzer according to any of the twelve preceding embodiments, wherein the arrangement positions of the second row are shifted relative to the arrangement postilions of the first row in the longitudinal direction.

Embodiment 32: The automatic analyzer according to any preceding embodiment, further comprising discharge devices configured to discharge reagent from the reagent vessels, wherein each of the discharge devices comprises an immersion tube configured to be immersed into a reagent vessel.

Embodiment 33: The automatic analyzer according to the preceding embodiment, wherein the immersion tube is formed straight and the discharge device is linearly moveable between an open position, in which the immersion tube is retracted from a reagent vessel, and a closed position, in which the immersion tube is immersed into the reagent vessel.

Embodiment 34: The automatic analyzer according to embodiment 32, wherein the immersion tube is curved and the discharge device is pivotally moveable between an open position, in which the immersion tube is retracted from a reagent vessel, and a closed position, in which the immersion tube is immersed into the reagent vessel.

Embodiment 35: The automatic analyzer according to any one of embodiments 32 to 34, further comprising a blocking device configured to allow a reagent vessel to be loaded into or to be unloaded from the drawer exclusively in a first extended position of the drawer proximal to the housing.

Embodiment 36: The automatic analyzer according to the preceding embodiment, wherein the blocking device is coupled to the discharge devices.

Embodiment 37: The automatic analyzer according to the preceding embodiment, wherein the blocking device is configured to block a movement of the discharge devices at least from the open position into the closed position if a wrong reagent vessel is detected and to allow a movement of the discharge device at least from the open position into the closed position if a correct reagent vessel is detected.

Embodiment 38: The automatic analyzer according to the preceding embodiment, wherein the blocking device is configured to block a movement of the discharge device at least from the closed position into the open position if an associated reagent vessel is not completed discharged.

Embodiment 39: The automatic analyzer according to any one of embodiments 35 to 38, wherein the blocking device is configured to prevent a reagent vessel to be loaded into or to be unloaded from the drawer in any extended position except for the first extended position of the drawer proximal to the housing.

Embodiment 40: The automatic analyzer according to the preceding embodiment, wherein the blocking device is configured to block a movement of the discharge devices associated with any extended position except for the first extended position at least from the closed position into the open position.

In order that the embodiments of the present disclosure may be more readily understood, reference is made to the following examples, which are intended to illustrate the disclosure, but not limit the scope thereof.

FIG. 1 shows a schematic illustration of an automatic analyzer 100 according to a first embodiment of the present disclosure. Particularly, FIG. 1 shows a schematic front view of the automatic analyzer 100. The automatic analyzer 100 is configured to analyze samples. The automatic analyzer 100 comprises a housing 102. The housing 102 at least partially encloses at least one analyzing instrument 104. For example, several analyzing instruments 104 may be present such as two, three or even more. The analyzing instruments 104 are configured to carry out analytical processes of the samples. The automatic analyzer 100 further comprises a drawer 106.

Figure 2:
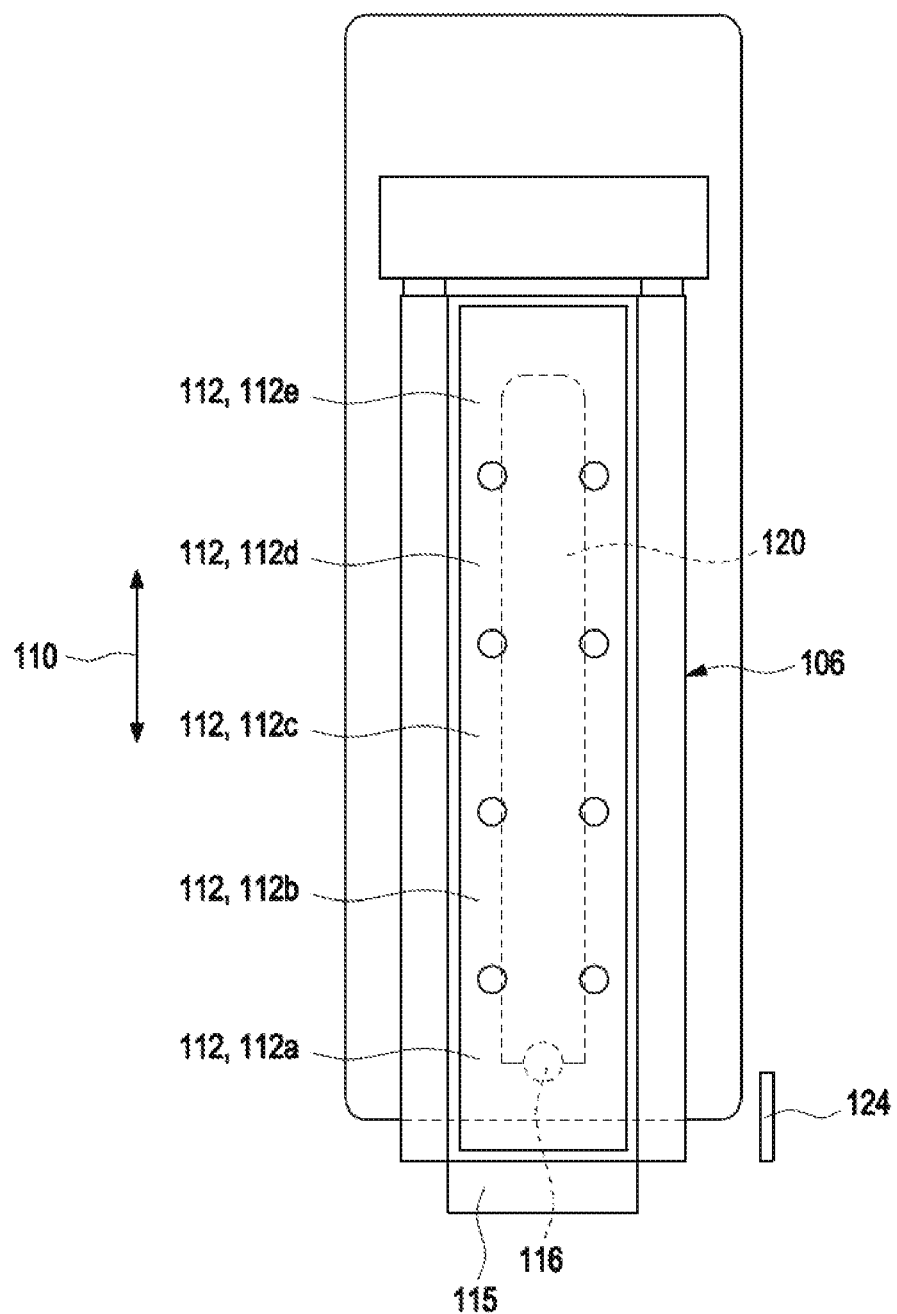
FIG. 2 shows a top view of a drawer of the automatic analyzer in accordance with an embodiment of the present disclosure.
Figure 3:
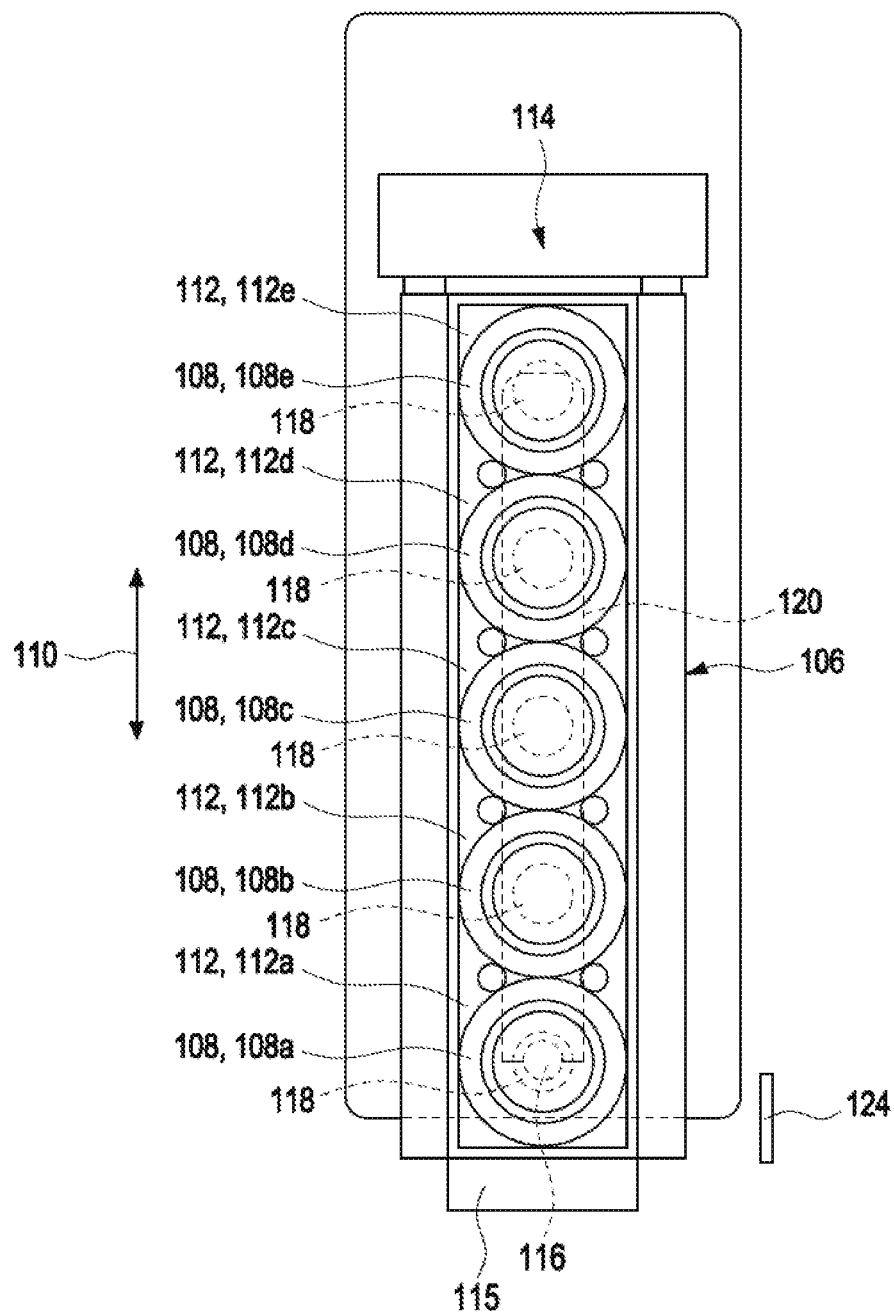
FIG. 3 shows a top view of the drawer including reagent vessels in accordance with an embodiment of the present disclosure.

FIG. 2 shows a top view of the drawer 106 of the automatic analyzer 100 according to the first embodiment of the present disclosure. The drawer 106 is configured to be loaded with a plurality of reagent vessels 108 (not shown in FIG. 2). FIG. 3 shows a top view of the drawer 106 including the reagent vessels 108. The drawer 106 is moveable in a longitudinal direction 110 relative to the housing 102 between a retracted position, in which the drawer 106 is retracted in the housing 102, and extended positions, in which the drawer 106 is extended from the housing 102 as will be explained in further detail below. The drawer 106 defines arrangement positions 112 for the reagent vessels 108 at least in a first row 114 parallel to the longitudinal direction 110. Merely as an example, the drawer 106 of the automatic analyzer 100 according to the first embodiment of the present disclosure defines five arrangement positions 112, which may also be identified as first arrangement position 112a to fifth arrangement position 112e hereinafter. Thus, the drawer 106 can be loaded with five reagent vessels 108 arranged in the first row 114, which may also be identified as first reagent vessel 108a to fifth reagent vessel 108e hereinafter. The indication of the reagent vessels 108a to 108e applies to the first row 114. It is explicitly stated, that the drawer 106 may define less or more than five arrangement positions 112 such as two, three, four, six, seven or even more arrangement positions. The arrangement positions 112 are defined in the longitudinal direction 110 such that the first arrangement position 112a is that arrangement position 112 closest to a leading end of the drawer 106 being furthest away from an interior of the housing 102 or closest to a user standing in front of the drawer 106, and the second and any subsequent arrangement positions 112b to 112e are defined towards the interior of the housing 102 or away from a user standing in front of the drawer 106. Further, merely as an example, the reagent vessels 108 are illustrated as bottles having a circular cross-section. However, it is explicitly stated that the present disclosure is applicable to any kind of reagent vessel such as cuboid or ashlar formed reagent vessels. In the present embodiment, the drawer 106 is manually moveable. Thus, the drawer 106 needs to be pulled or pushed by a user of the automatic analyzer 100. For this reason, the drawer 106 may comprise a handle 115 that can be gripped by the user. Particularly, the drawer 106 is moveable in predetermined steps into the extended positions corresponding to the arrangement positions 112. With other words, the drawer 106 is configured to be extended from the housing 102 in steps having dimensions corresponding to the size of the reagent vessels 108 such that with each of the extended positions in a subsequent order, a further reagent vessel 108 in the order of the first row 114 is moved and located outside from the housing 102. For this purpose, the automatic analyzer 100 further comprises halts such as latches (not shown in detail) configured to halt the drawer 106 in each of the extended positions.

The automatic analyzer 100 further comprises a first detector 116. The first detector 116 is associated with the first row 114 and is configured to identify the reagent vessels 108 at a first detection position when arranged in the first row 114. The first detector 116 is a RFID reader configured to identify the reagent vessels 108 by means of a RFID tag 118 attached to an outer surface of each reagent vessel 108 in the first row 114. The first detector 116 is arranged below the drawer 106 as the RFID tags 118 are attached to a bottom surface of the reagent vessels 108.

Figure 4:
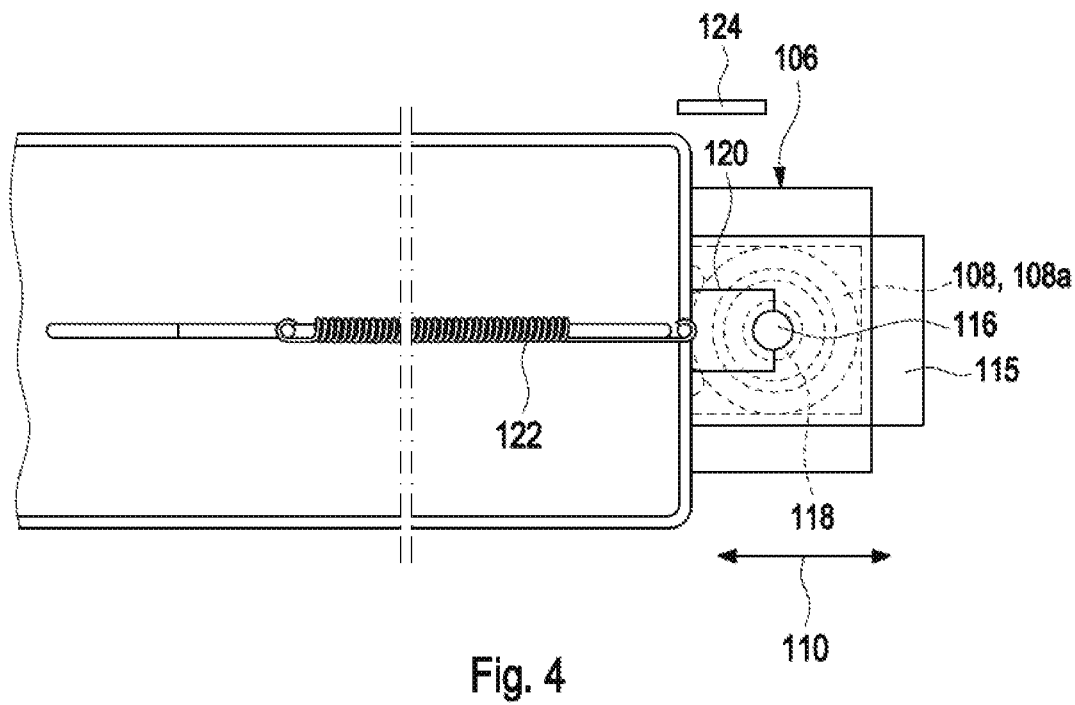
FIG. 4 shows a bottom view of the drawer of the automatic analyzer in accordance with an embodiment of the present disclosure.

FIG. 4 shows a bottom view of the drawer 106 of the automatic analyzer 100 according to the first embodiment of the present disclosure. The automatic analyzer 100 further comprises a first slider 120. The first detector 116 is mounted to the first slider 120. The first slider 120 is moveable between a slider retracted position, in which the first slider 120 is retracted in the housing 102, and a slider extended position, in which the first slider 120 is extended at a proximal position from the housing 102. FIG. 4 shows the first slider 120 in the slider extended position, which is adjacent the housing 102. As can be seen, the first slider 120 is biased towards the slider retracted position by means of a spring 122 or the like. The first slider 120 is connected to the drawer 106 by means of a guide, rails, or the like, such that a movement of the first slider 120 is coupled to a movement of the drawer 106. The slider extended position overlaps with the first detection position. Thus, when the first slider 120 is extended to the slider extended position by moving the drawer 106 into any one of the extended positions, the first detector 116 is in the first detection position so as to identify a reagent vessel 108 above the first detection position. Further, the first detector 116 is triggered when the first slider 120 is moved to the slider extended position or when a reagent vessel is loaded into the drawer 106 in the first row 114 or when a reagent vessel 108 is unloaded from the first row 114 of the drawer 106. For this purpose, the automatic analyzer 100 further comprises a switch, a sensor, or light barrier 124 configured to trigger the first detector 116. Thus, the first detector 116 is not permanently operated but only when being triggered. As shown in FIG. 1, the automatic analyzer 100 may optionally further comprise a display device 126 configured to display at least one of the following detection results from the first detector 116: no reagent vessel at a first arrangement position defined by the first detection position, a wrong reagent vessel at a first arrangement position defined by the first detection position, and a correct reagent vessel at a first arrangement position defined by the first detection position. The first detector 116 may be configured to detect a moving direction of the drawer 106. For example, the first detector 116 is configured to detect the moving direction of the drawer 106 by means of position markers (not shown in detail) arranged between the arrangement positions 112 of the first row.

Hereinafter, an operation of the automatic analyzer 100 of the first embodiment will be described with reference to FIGS. 1 to 9. The explanation of the operation starts with the drawer 106 being in the retracted position with all reagent vessels 108 of the first row 114 loaded in the drawer 106 shown in FIGS. 1 to 3. Thus, the reagents from each of the reagent vessels 108 can be supplied to the analytical instruments 104. If any one of the reagent vessels 108 has to be changed or replaced, the drawer 106 has to be moved in the respective extended position as will explained in further detail below.

Figure 5:
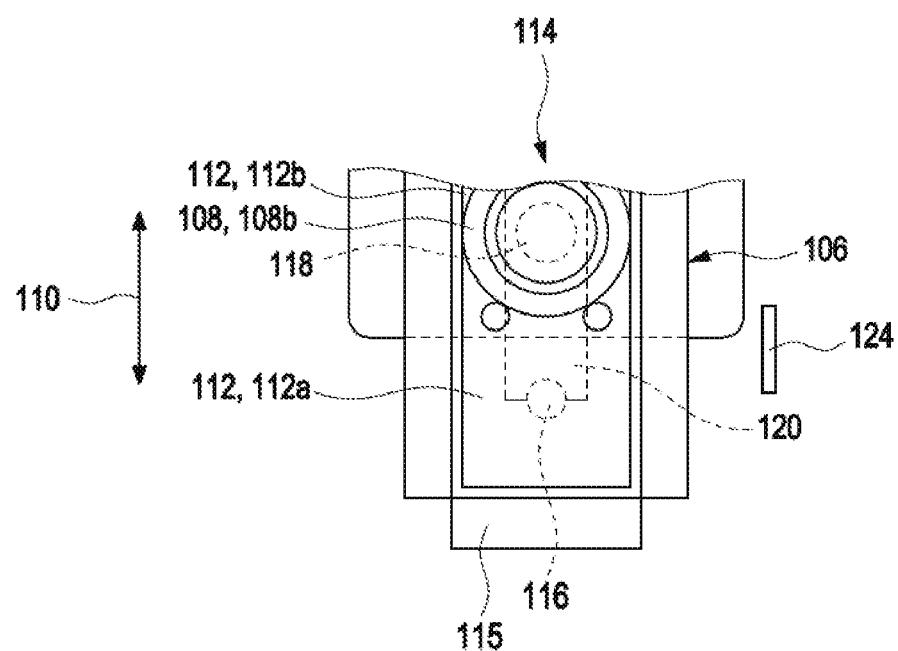
FIG. 5 shows a top view of the drawer in a first extended position in accordance with an embodiment of the present disclosure.

FIG. 5 shows a top view of the drawer 106 in a first extended position. Assuming that a first reagent vessel 108a disposed at the first arrangement position 112a being furthest away from an interior of the housing 102 or closest to a user standing in front of the drawer 106 has to be replaced, for example because of the reagent thereof has been consumed, the user pulls the drawer 106 and moves it from the retracted position as shown in FIG. 2 to the first extended position shown in FIG. 5, which is proximal to the housing 102. Concertedly or together with the movement of the drawer 106, the first slider 120 is moved into the slider extended position as shown in FIG. 4, which is proximal to the housing 102. Thereby, the first detector 116 is moved to the first detection position as it is mounted to the first slider 120. The movement of the drawer 106 is detected by the light barrier 124, which triggers the first detector 116. In the first extended position, the first reagent vessel 108a in the first row 114 may be taken out and replaced by a new first reagent vessel 108a. The first detector 116 identifies the new first reagent vessel 108a after being loaded into the drawer at the first arrangement position 112a by reading the RFID tag 118 attached to the bottom surface thereof. Only if the new first reagent vessel 108a at the first arrangement position 112a contains the correct reagent, i.e., the reagent contained in the new first reagent vessel 108a corresponds to the target reagent associated with the first arrangement position 112a, the user is allowed to move the drawer 106 back to the retracted position. As the first slider 120 is biased into the slider retracted position, the first slider 120 together with the drawer 106 moves in the slider retracted position without requiring to be separately moved by the user. The first detector 116 can also be moved back into the housing 102 as it is mounted to the first slider 120. If the new first reagent vessel 108a at the first arrangement position 112a does not contain the correct reagent, the drawer 106 is blocked from being moved back into the retracted position as will be explained in further detail below.

Figure 6:
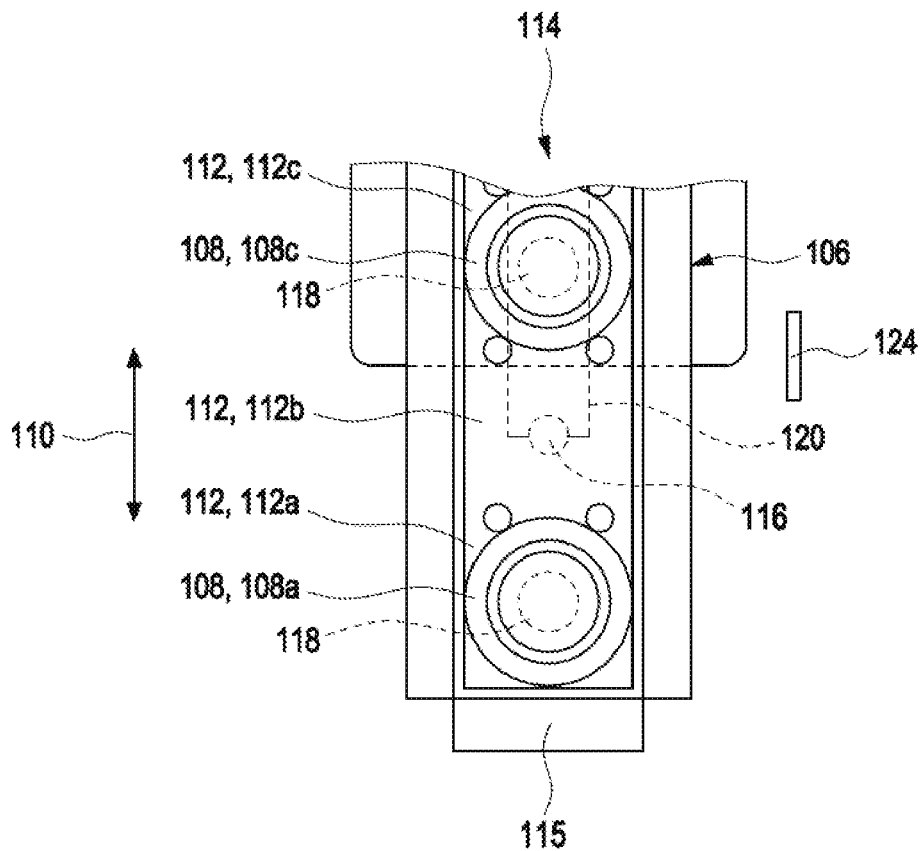
FIG. 6 shows a top view of the drawer in a second extended position in accordance with an embodiment of the present disclosure.

FIG. 6 shows a top view of the drawer 106 in a second extended position. Assuming that a second reagent vessel 108b disposed at the second arrangement position 112b has to be replaced, for example because of the reagent thereof has been consumed, the user pulls the drawer 106 and moves it from the retracted position as shown in FIG. 2 to the second extended position shown in FIG. 5 following the first extended position in the longitudinal direction 110 outwards from the housing 102. Concertedly or together with the movement of the drawer 106, the first slider 120 is moved into the slider extended position as shown in FIG. 4, which is proximal to the housing 102. Thereby, the first detector 116 is moved to the first detection position as it is mounted to the first slider 120. The movement of the drawer 106 is detected by the light barrier 124, which triggers the first detector 116. In the second extended position, the second reagent vessel 108b in the row 114 may be taken out and replaced by a new second reagent vessel 108b. The first detector 116 identifies the new second reagent vessel 108b after being loaded into the drawer 106 at the second arrangement position 112b by reading the RFID tag 118 attached to the bottom surface thereof. Only if the new second reagent vessel 108b at the second arrangement position 112b contains the correct reagent, i.e., the reagent contained in the new second reagent vessel 108b corresponds to the target reagent associated with the second arrangement position 112b, the user is allowed to move the drawer 106 back to the retracted position. As the first slider 120 is biased into the slider retracted position, the first slider 120 together with the drawer 106 moves in the slider retracted position without requiring to be separately moved by the user. The first detector 116 can also be moved back into the housing 102 as it is mounted to the first slider 120. If the new second reagent vessel 108b at the second arrangement position 112b does not contain the correct reagent, the drawer 106 is blocked from being moved back into the retracted position as will be explained in further detail below.

Figure 7:
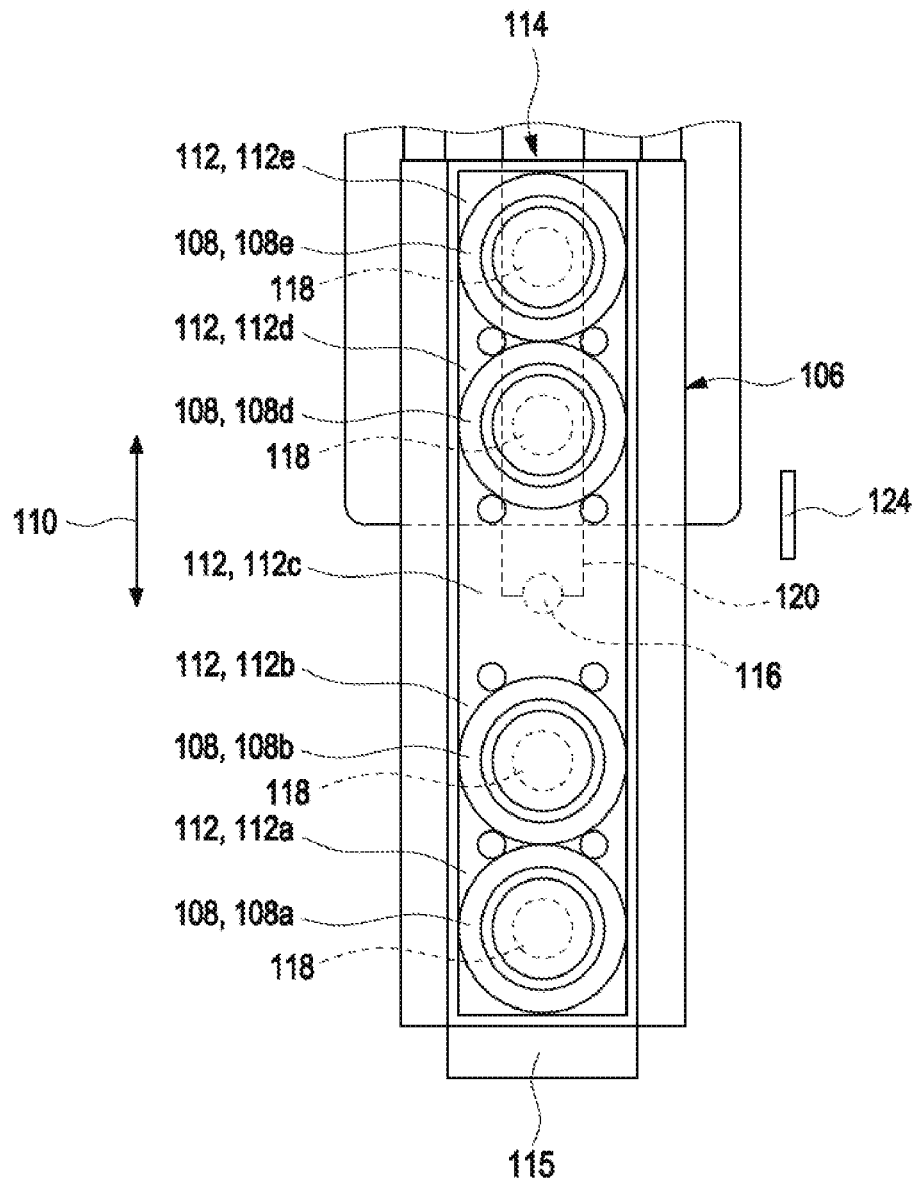
FIG. 7 shows a top view of the drawer in a third extended position in accordance with an embodiment of the present disclosure.

FIG. 7 shows a top view of the drawer 106 in a third extended position. Assuming that a third reagent vessel 108c disposed at the third arrangement position 112c has to be replaced, for example because of the reagent thereof has been consumed, the user pulls the drawer 106 and moves it from the retracted position as shown in FIG. 2 to the third extended position shown in FIG. 7 following the second extended position in the longitudinal direction 110 outwards from the housing 102. Concertedly or together with the movement of the drawer 106, the first slider 120 can be moved into the slider extended position as shown in FIG. 4, which is proximal to the housing 102. Thereby, the first detector 116 is moved to the first detection position as it is mounted to the first slider 120. The movement of the drawer 106 is detected by the light barrier 124, which triggers the first detector 116. In the third extended position, the third reagent vessel 108c in the row 114 may be taken out and replaced by a new third reagent vessel 108c. The first detector 116 identifies the new third reagent vessel 108c after being loaded into the drawer 106 at the third arrangement position 112c by reading the RFID tag 118 attached to the bottom surface thereof. Only if the new third reagent vessel 108c at the third arrangement position 112c contains the correct reagent, i.e., the reagent contained in the new second reagent vessel 108b corresponds to the target reagent associated with the third arrangement position 112b, the user is allowed to move the drawer 106 back to the retracted position. As the first slider 120 is biased into the slider retracted position, the first slider 120 together with the drawer 106 moves in the slider retracted position without requiring to be separately moved by the user. The first detector 116 can also be moved back into the housing 102 as it is mounted to the first slider 120. If the new third reagent vessel 108c at the third arrangement position 112c does not contain the correct reagent, the drawer 106 is blocked from being moved back into the retracted position as will be explained in further detail below.

Figure 8:
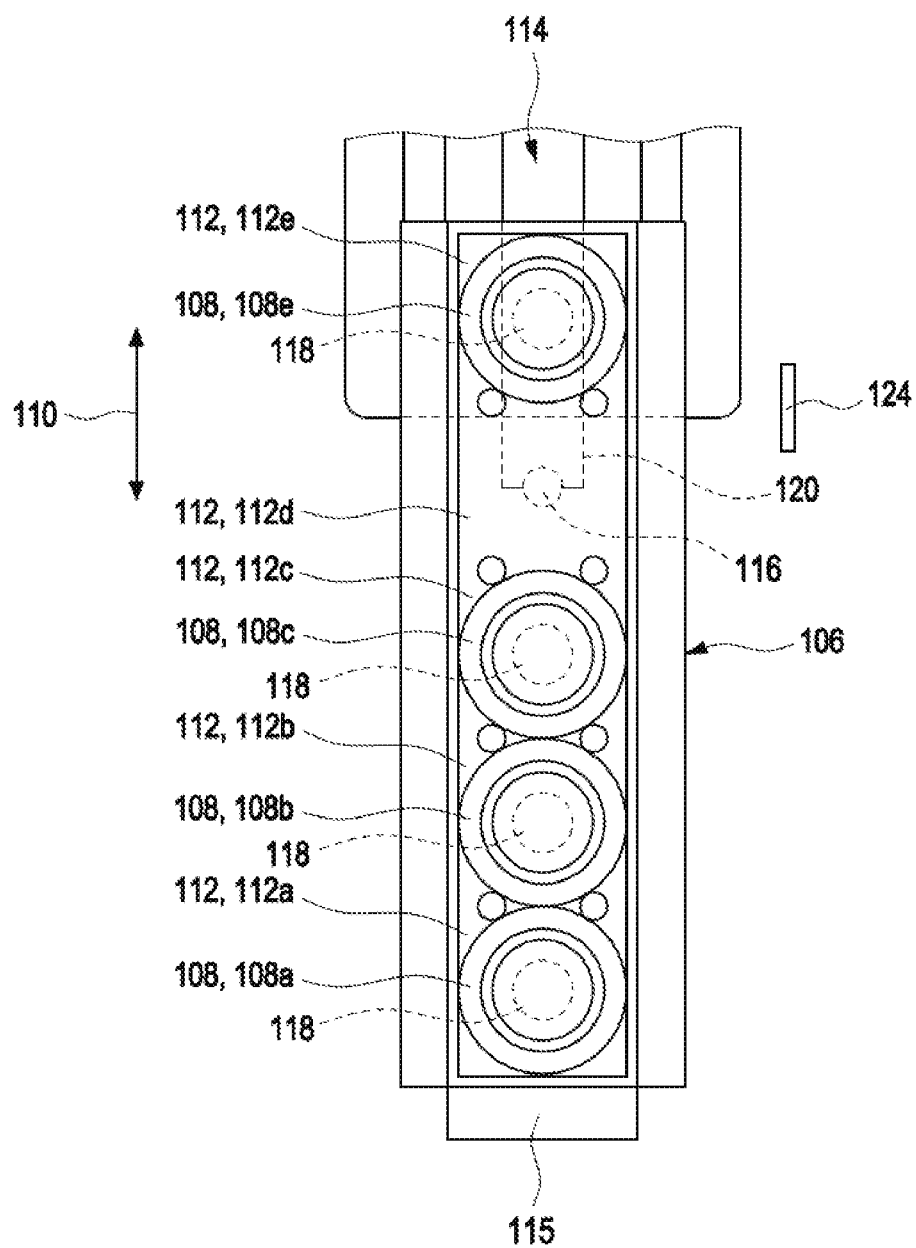
FIG. 8 shows a top view of the drawer in a fourth extended position in accordance with an embodiment of the present disclosure.

FIG. 8 shows a top view of the drawer 106 in a fourth extended position. Assuming that a fourth reagent vessel 108d disposed at the fourth arrangement position 112d has to be replaced, for example because of the reagent thereof has been consumed, the user pulls the drawer 106 and moves it from the retracted position as shown in FIG. 2 to the fourth extended position shown in FIG. 8 following the third extended position in the longitudinal direction 110 outwards from the housing 102. Concertedly or together with the movement of the drawer 106, the first slider 120 is moved into the slider extended position as shown in FIG. 4, which is proximal to the housing 102. Thereby, the first detector 116 is moved to the first detection position as it is mounted to the first slider 120. The movement of the drawer 106 is detected by the light barrier 124, which triggers the first detector 116. In the fourth extended position, the fourth reagent vessel 108d in the row 114 may be taken out and replaced by a new fourth reagent vessel 108d. The first detector 116 identifies the new fourth reagent vessel 108d after being loaded into the drawer 106 at the fourth arrangement position 112d by reading the RFID tag 118 attached to the bottom surface thereof. Only if the new fourth reagent vessel 108d at the fourth arrangement position 112d contains the correct reagent, i.e., the reagent contained in the new fourth reagent vessel 108d corresponds to the target reagent associated with the fourth arrangement position 112d, the user is allowed to move the drawer 106 back to the retracted position. As the first slider 120 is biased into the slider retracted position, the first slider 120 together with the drawer 106 moves in the slider retracted position without requiring to be separately moved by the user. The first detector 116 can also be moved back into the housing 102 as it is mounted to the first slider 120. If the new fourth reagent vessel 108d at the fourth arrangement position 112d does not contain the correct reagent, the drawer 106 is blocked from being moved back into the retracted position as will be explained in further detail below.

Figure 9:
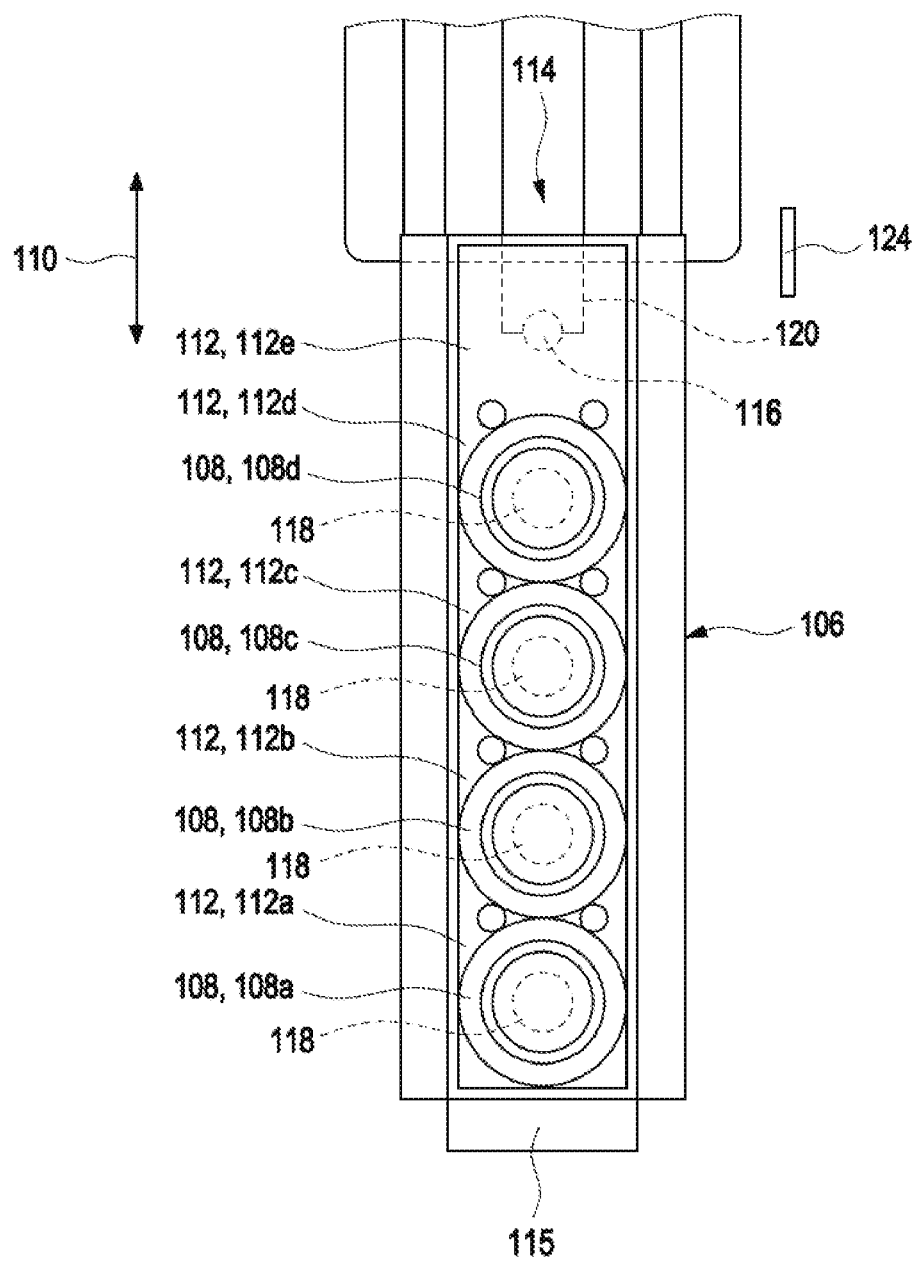
FIG. 9 shows a top view of the drawer in a fifth extended position in accordance with an embodiment of the present disclosure.

FIG. 9 shows a top view of the drawer 106 in a fifth extended position. Assuming that a fifth reagent vessel 108e disposed at the fifth arrangement position 112e has to be replaced, for example because of the reagent thereof has been consumed, the user pulls the drawer 106 and moves it from the retracted position as shown in FIG. 2 to the fifth extended position shown in FIG. 9 following the fourth extended position in the longitudinal direction 110 outwards from the housing 102. Concertedly or together with the movement of the drawer 106, the first slider 120 is moved into the slider extended position as shown in FIG. 4, which is proximal to the housing 102. Thereby, the first detector 116 is moved to the first detection position as it is mounted to the first slider 120. The movement of the drawer 106 is detected by the light barrier 124, which triggers the first detector 116. In the fifth extended position, the fifth reagent vessel 108e in the row 114 may be taken out and replaced by a new fifth reagent vessel 108e. The first detector 116 identifies the new fifth reagent vessel 108e after being loaded into the drawer 106 at the fifth arrangement position 112e by reading the RFID tag 118 attached to the bottom surface thereof. Only if the new fifth reagent vessel 108e at the fifth arrangement position 112e contains the correct reagent, i.e., the reagent contained in the new fifth reagent vessel 108e corresponds to the target reagent associated with the fifth arrangement position 112e, the user is allowed to move the drawer 106 back to the retracted position. As the first slider 120 is biased into the slider retracted position, the first slider 120 together with the drawer 106 moves in the slider retracted position without requiring to be separately moved by the user. The first detector 116 can also be moved back into the housing 102 as it is mounted to the first slider 120. If the new fifth reagent vessel 108e at the fifth arrangement position 112e does not contain the correct reagent, the drawer 106 is blocked from being moved back into the retracted position as will be explained in further detail below.

Figure 10:
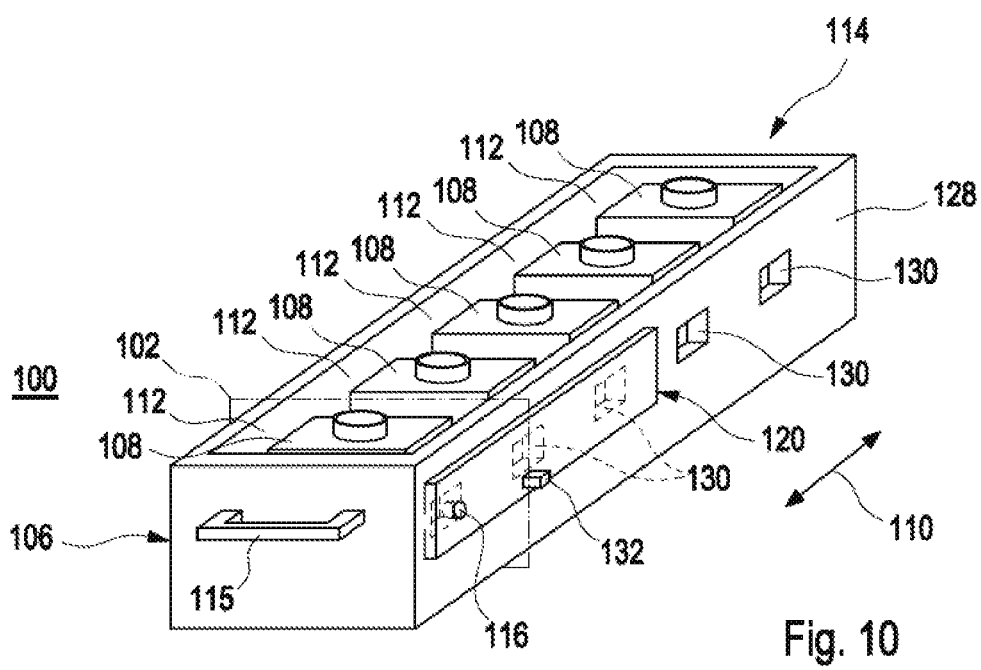
FIG. 10 shows a perspective view of an automatic analyzer in accordance with an embodiment of the present disclosure.

FIG. 10 shows a perspective view of an automatic analyzer 100 according to a second embodiment of the present disclosure. Hereinafter, only the differences from the automatic analyzer 100 according to first embodiment of the present disclosure will be explained and identical or comparable constructional members and features are indicated by like reference numerals. With the automatic analyzer 100 according to the second embodiment of the present disclosure, the first detector 116 is arranged laterally next to the drawer 106. Further, the first slider 120 is also arranged laterally next to the drawer 106. Merely as an example, the first detector 116 and the first slider 120, respectively, are arranged laterally next to a side wall 128 of the drawer 106. Further, the side wall 128 comprises openings 130. The openings 130 are located at positions overlapping with the arrangement positions 112 of the reagent vessels 108 if seen in the longitudinal direction 110. Further, the number of openings 130 corresponds to the number of arrangement positions 112. Thereby, the first detector 116 is configured to detect RFID tags 118 attached to a side surface of the reagent vessels 108 as the RFID tags 118 are exposed by means of the openings 130. The openings 130 may alternatively be areas without metal or any other electrical shielding material, e.g., a closed plastic wall, such that the RFID tags 118 can be read without optical contact between tag and detector.

Figure 11:
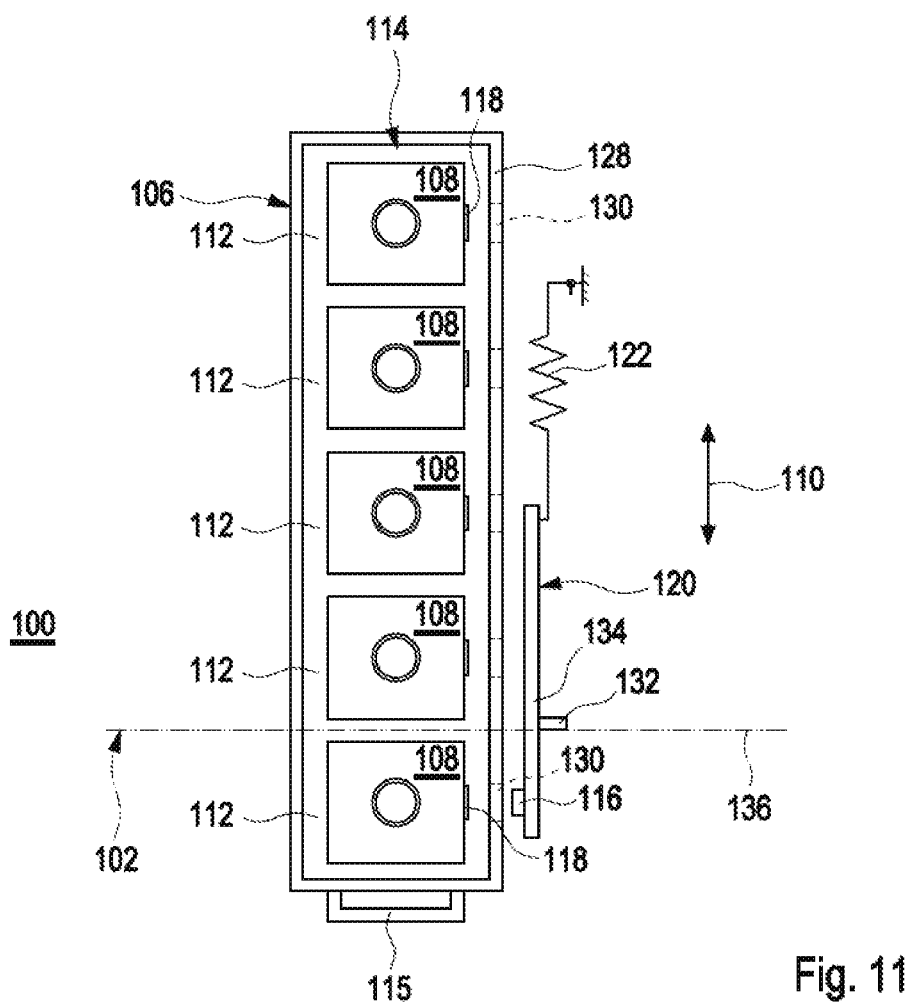
FIG. 11 shows a top view of a drawer of the automatic analyzer in accordance with an embodiment of the present disclosure.

FIG. 11 shows a top view of the drawer of the automatic analyzer 100 according to the second embodiment of the present disclosure. The drawer 106 is shown in the first extended position. The first slider 120 is biased towards the slider retracted position by means of a spring 122 or the like arranged laterally next to the drawer 106. Further, the first slider 120 comprises a stopper 132 at a rear end 134 thereof configured to engage a front edge 136 of the housing 102 when the first slider 120 is in the slider extended position. Thereby, the movement of the first slider 120 is limited to the slider extended position and a further outwards movement is prevented. The basic operation of the automatic analyzer 100 according to the second embodiment is identical to the operation of the automatic analyzer 100 according to the first embodiment. The second embodiment may be typical as it involves significant advantages regarding its compactness or spatial arrangement of the respective constructional members. Particularly, the lateral arrangement of the first slider 120 and the first detector 116 saves space if compared to an arrangement below the drawer 106. Further, this lateral arrangement requires the RFID tags 118 to be attached to a side surface of the reagent vessels 108, which is easier than attaching to the bottom surface.

Figure 12:
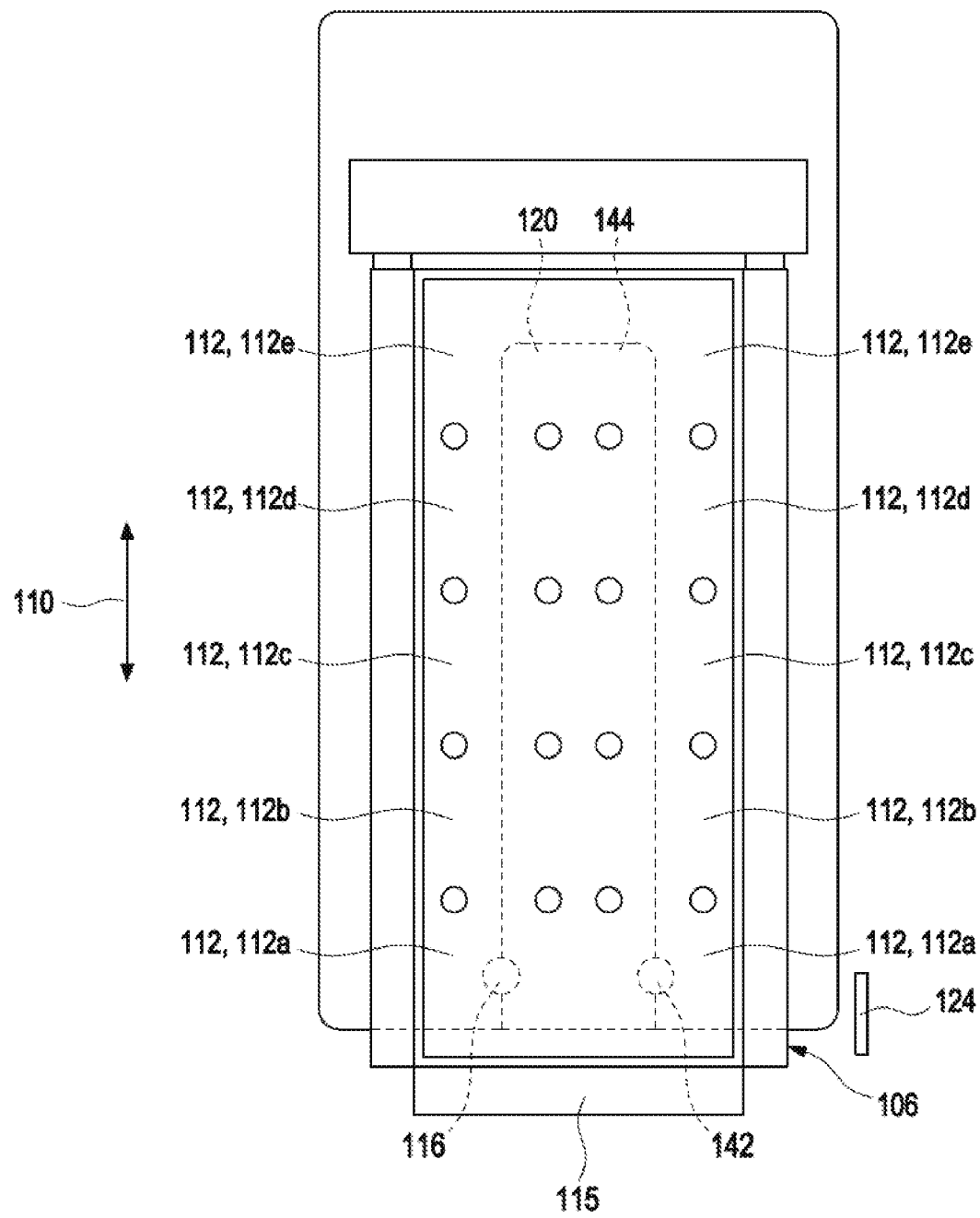
FIG. 12 shows a top view of a drawer of an automatic analyzer in accordance with an embodiment of the present disclosure.
Figure 13:
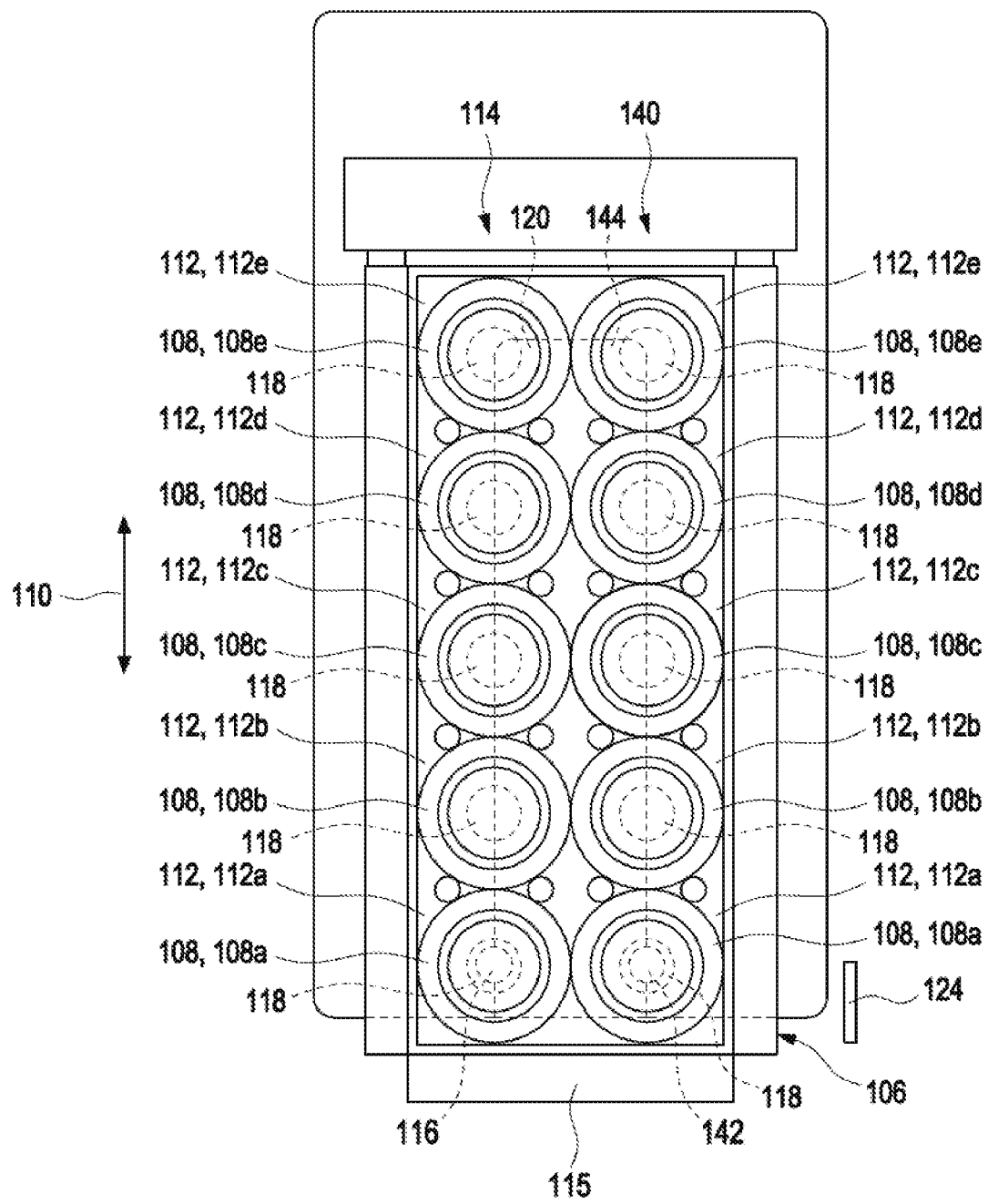
FIG. 13 shows a top view of the drawer including reagent vessels in accordance with an embodiment of the present disclosure.

FIG. 12 shows a top view of a drawer 106 of an automatic analyzer 100 according to a third embodiment of the present disclosure. Hereinafter, only the differences from the automatic analyzer 100 according to first embodiment of the present disclosure will be explained and identical or comparable constructional members and features are indicated by like reference numerals. The drawer 106 further defines arrangement positions 112 for the reagent vessels 108 (not shown in FIG. 12) at least in a second row 140 parallel to the longitudinal direction 110. The reagent vessels 108 are not shown in FIG. 12 for explanatory reasons. FIG. 13 shows a top view of the drawer 106 including the reagent vessels 108. Merely as an example, the drawer 106 of the automatic analyzer 100 according to the third embodiment of the present disclosure defines five arrangements positions 112 with the second row 140, which may also be identified as first arrangement position 112a to fifth arrangement position 112e hereinafter. Thus, the drawer 106 can be loaded with five reagent vessels 108 arranged in the second row 140, which may also be identified as first reagent vessel 108a to fifth reagent vessel 108e of the second row 140 hereinafter. The provision of a first row 114 and a second row 140 allows to load the drawer 106 at each of the arrangement positions 112 of the first row 114 and second row 140 with reagent vessels 108 containing identical reagents. Thus, a so-called bottle or vessel changeover is allowed as for each arrangement position 112 two identical reagents are present. With other words, if the reagent is consumed from a reagent vessel in one of the rows 114, 120, the automatic analyzer 100 may switch to the reagent vessel at the same arrangement position 112 in the other row 120, 144 without the need to break its operation.

The automatic analyzer 100 further comprises a second detector 142. The second detector 142 is associated with the second row 140 and is configured to identify the reagent vessels 108 at a second detection position when arranged in the second row 140. The second detector 142 is a RFID reader configured to identify the reagent vessels 108 of the second row 140 by means of a RFID tag 118 attached to an outer surface of each reagent vessel 108 in the second row 140. The second detector 142 is arranged below the drawer 106 as the RFID tags 118 are attached to a bottom surface of the reagent vessels 108.

Figure 14:
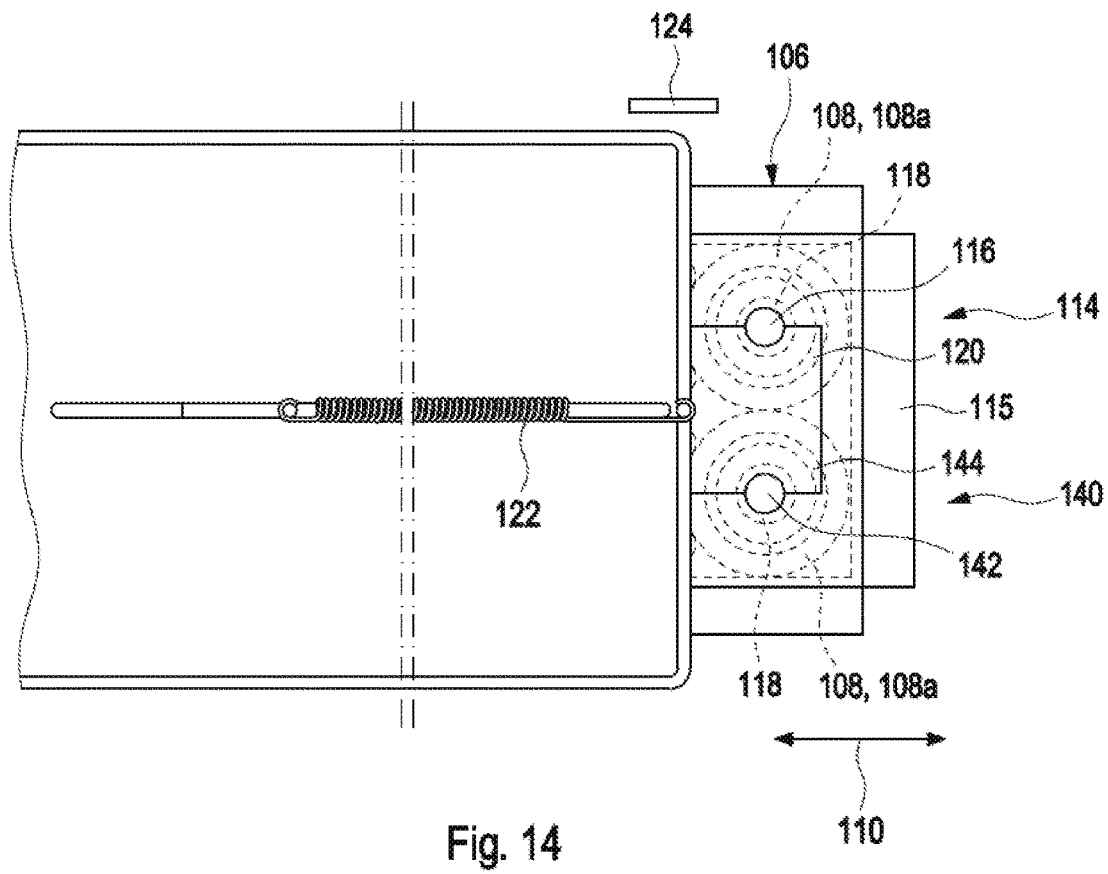
FIG. 14 shows a bottom view of the drawer in accordance with an embodiment of the present disclosure.

FIG. 14 shows a bottom view of the drawer 106. The automatic analyzer 100 further comprises a second slider 144. The second detector 142 is mounted to the second slider 144. The second slider 144 is moveable between a slider retracted position, in which the second slider 144 is retracted in the housing 102, and a slider extended position, in which the second slider 144 is extended at a proximal position from the housing 102. The first and second sliders 120, 144 are connected to one another or integrally formed. Thus, the first and second sliders 120, 144 are moveable together. FIG. 14 shows the second slider 144 in the slider extended position, which is adjacent the housing 102. As can be seen, the second slider 144 is biased towards the slider retracted position by means of a spring 122 or the like. The second slider 144 is connected to the drawer 106 by means of a guide, rails, or the like, such that a movement of the second slider 144 is coupled to a movement of the drawer 106. The slider extended position overlaps with the second detection position. Thus, when the second slider 144 is extended to the slider extended position by moving the drawer 106 into any one of the extended positions, the second detector 142 is in the second detection position so as to identify a reagent vessel 108 above the second detection position. Further, the second detector 142 is triggered when the second slider 144 is moved to the slider extended position or when a reagent vessel is loaded into the drawer 106 in the second row 140 or when a reagent vessel 108 is unloaded from the second row 140 of the drawer 106. For this purpose, the automatic analyzer 100 further comprises a switch, a sensor, or light barrier 124 configured to trigger the second detector 142. Thus, the second detector 142 is not permanently operated but only when being triggered. The optional display device 126 may be configured to display at least one of the following detection results from the second detector 142: no reagent vessel at an arrangement position defined by the second detection position, a wrong reagent vessel at an arrangement position defined by the second detection position, and a correct reagent vessel at an arrangement position defined by the second detection position. A display device separate from the display device 126 shown may be present, which in turn is associated with the second row 140. With other words, for each row a separate display device may be present. The second detector 142 may be configured to detect a moving direction of the drawer 106. For example, the second detector 142 is configured to detect the moving direction of the drawer 106 by means of position markers (not shown in detail) arranged between the arrangement positions 112 of the second row 140.

Hereinafter, an operation of the automatic analyzer 100 of the third embodiment will be described with reference to FIGS. 12 to 19. The explanation of the operation starts with the drawer 106 being in the retracted position with all reagent vessels 108 of the first row 114 and second row 140 loaded in the drawer 106 shown in FIGS. 12 and 13. Thus, the reagents from each of the reagent vessels 108 can be supplied to the analytical instruments 104. If any one of the reagent vessels 108 has to be changed or replaced, the drawer 106 has to be moved in the respective extended position as will explained in further detail below.

Figure 15:
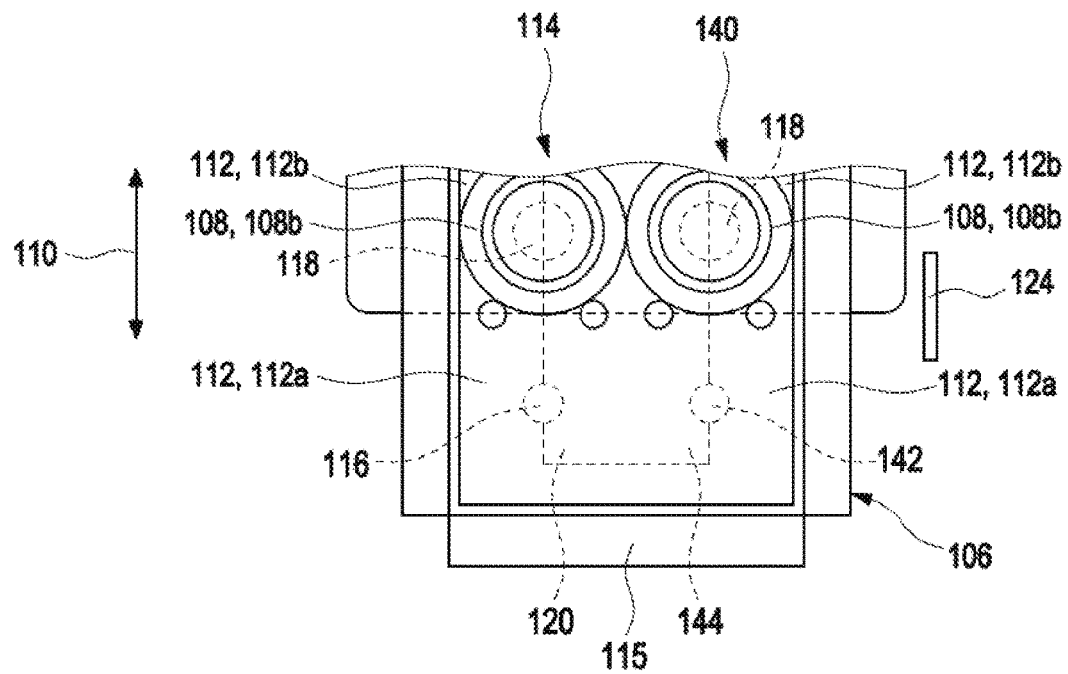
FIG. 15 shows a top view of the drawer in a first extended position in accordance with an embodiment of the present disclosure.

FIG. 15 shows a top view of the drawer 106 in a first extended position. Assuming that a first reagent vessel 108a disposed at the first arrangement position 112a of the first row 114 and/or the second row 140 being furthest away from an interior of the housing 102 or closest to a user standing in front of the drawer 106 has to be replaced, for example because of the reagent thereof has been consumed, the user pulls the drawer 106 and moves it from the retracted position as shown in FIG. 12 to the first extended position shown in FIG. 15, which is proximal to the housing 102. Concertedly or together with the movement of the drawer 106, the first slider 120 and the second sider 144 are moved into the slider extended position as shown in FIG. 14, which is proximal to the housing 102. Thereby, the first detector 116 and the second detector 142 are moved to the first detection position and the second detection position as they are mounted to the first slider 120 and the second slider 144, respectively. The movement of the drawer 106 is detected by the light barrier 124, which triggers the first detector 116 and/or the second detector 142. In the first extended position, the first reagent vessel 108*a* in the first row 114 and/or the second row 140 may be taken out and replaced by a new first reagent vessel 108*a*. The first detector 116 and/or the second detector 142 identifies the new first reagent vessel 108*a* after being loaded into the drawer 106 at the first arrangement position 112*a* by reading the RFID tag 118 attached to the bottom surface thereof. Only if the new first reagent vessel 108*a* at the first arrangement position 112*a* contains the correct reagent, i.e., the reagent contained in the new first reagent vessel 108*a* corresponds to the target reagent associated with the first arrangement position 112*a* of the first row 114 or the second row 140, the user is allowed to move the drawer 106 back to the retracted position. As the first slider 120 and the second slider 144 are biased into the slider retracted position, the first slider 120 and the second slider 144 together with the drawer 106 move in the slider retracted position without requiring to be separately moved by the user. The first detector 116 and the second detector 142 can also be moved back into the housing 102 as they are mounted to the first slider 120 and the second slider 44, respectively. If the new first reagent vessel 108*a* at the first arrangement position 112*a* of the first row 114 or the second row 140 does not contain the correct reagent, the drawer 106 is blocked from being moved back into the retracted position as will be explained in further detail below.

Figure 16:
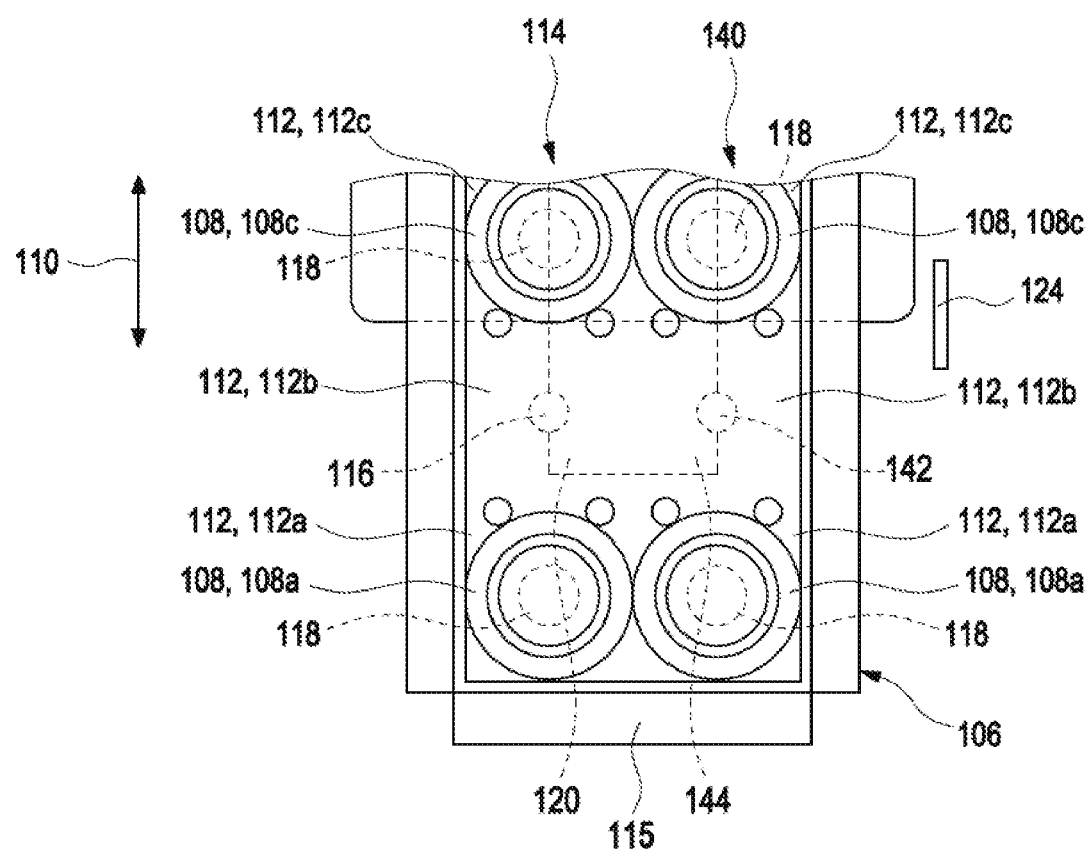
FIG. 16 shows a top view of the drawer in a second extended position in accordance with an embodiment of the present disclosure.

FIG. 16 shows a top view of the drawer 106 in a second extended position. Assuming that a second reagent vessel 108*b* of the first row 114 and/or the second row 140 disposed at the second arrangement position 112*b* has to be replaced, for example because of the reagent thereof has been consumed, the user pulls the drawer 106 and moves it from the retracted position as shown in FIG. 12 to the second extended position shown in FIG. 16 following the first extended position in the longitudinal direction 110 outwards from the housing 102. Concertedly or together with the movement of the drawer 106, the first slider 120 and the second slider 144 are moved into the slider extended position as shown in FIG. 14, which is proximal to the housing 102. Thereby, the first detector 116 and the second detector 142 are moved to the first detection position and the second detection position as they are mounted to the first slider 120 and the second slider 144, respectively. The movement of the drawer 106 is detected by the light barrier 124, which triggers the first detector 116 and/or the second detector 142. In the second extended position, the second reagent vessel 108*b* in the first row 114 and/or the second row 140 may be taken out and replaced by a new second reagent vessel 108*b*. The first detector 116 and/or the second detector 142 identifies the new second reagent vessel 108*b* after being loaded into the drawer 106 at the second arrangement position 112*b* of the first row 114 and/or the second row 140 by reading the RFID tag 118 attached to the bottom surface thereof. Only if the new second reagent vessel 108*b* at the second arrangement position 112*b* of the first row 114 and/or the second row 140 contains the correct reagent, i.e., the reagent contained in the new second reagent vessel 108*b* corresponds to the target reagent associated with the second arrangement position 112*b* of the first row 114 and/or the second row 140, the user is allowed to move the drawer 106 back to the retracted position. As the first slider 120 and the second slider 144 are biased into the slider retracted position, the first slider 120 and the second slider 144 together with the drawer 106 move in the slider retracted position without requiring to be separately moved by the user. The first detector 116 and the second detector 142 can also be moved back into the housing 102 as they are mounted to the first slider 120 and the second slider 144, respectively. If the new second reagent vessel 108*b* at the second arrangement position 112*b* of the first row 114 and/or the second row 140 does not contain the correct reagent, the drawer 106 is blocked from being moved back into the retracted position as will be explained in further detail below.

Figure 17:
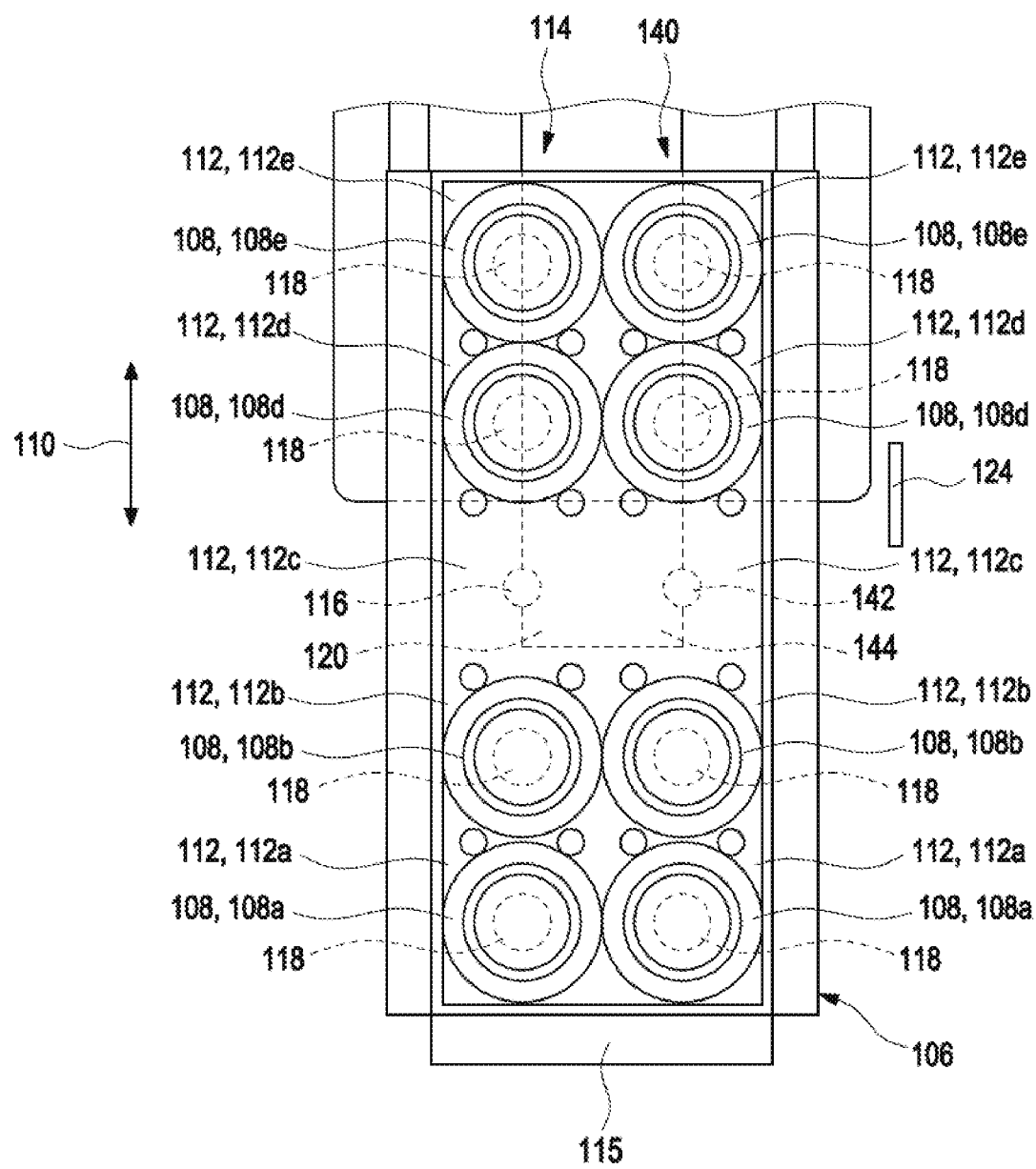
FIG. 17 shows a top view of the drawer in a third extended position in accordance with an embodiment of the present disclosure.

FIG. 17 shows a top view of the drawer 106 in a third extended position. Assuming that a third reagent vessel 108*c* disposed at the third arrangement position 112*c* of the first row 114 and/or the second row 140 has to be replaced, for example because of the reagent thereof has been consumed, the user pulls the drawer 106 and moves it from the retracted position as shown in FIG. 12 to the third extended position shown in FIG. 17 following the second extended position in the longitudinal direction 110 outwards from the housing 102. Concertedly or together with the movement of the drawer 106, the first slider 120 and the second slider 144 are moved into the slider extended position as shown in FIG. 14, which is proximal to the housing 102. Thereby, the first detector 116 and the second detector 142 are moved to the first detection position and the second detection position as they are mounted to the first slider 120 and the second slider 144, respectively. The movement of the drawer 106 is detected by the light barrier 124, which triggers the first detector 116 and/or the second detector 142. In the third extended position, the third reagent vessel 108*c* in the first row 114 and/or second row 140 may be taken out and replaced by a new third reagent vessel 108*c*. The first detector 116 and/or second detector 142 identifies the new third reagent vessel 108*b* after being loaded into the drawer 106 at the third arrangement position 112*c* of the first row 114 and/or the second row 140 by reading the RFID tag 118 attached to the bottom surface thereof. Only if the new third reagent vessel 108*c* at the third arrangement position 112*c* of the first row 114 and/or the second row 140 contains the correct reagent, i.e., the reagent contained in the new second reagent vessel 108*b* corresponds to the target reagent associated with the third arrangement position 112*c*, the user is allowed to move the drawer 106 back to the retracted position. As the first slider 120 and the second slider 144 are biased into the slider retracted position, the first slider 120 and the second slider 144 together with the drawer 106 move in the slider retracted position without requiring to be separately moved by the user. The first detector 116 and the second detector 142 can also be moved back into the housing 102 as they are mounted to the first slider 120 and the second slider 144, respectively. If the new third reagent vessel 108*c* at the third arrangement position 112*c* of the first row 114 and/or the second row 140 does not contain the correct reagent, the drawer 106 is blocked from being moved back into the retracted position as will be explained in further detail below.

Figure 18:
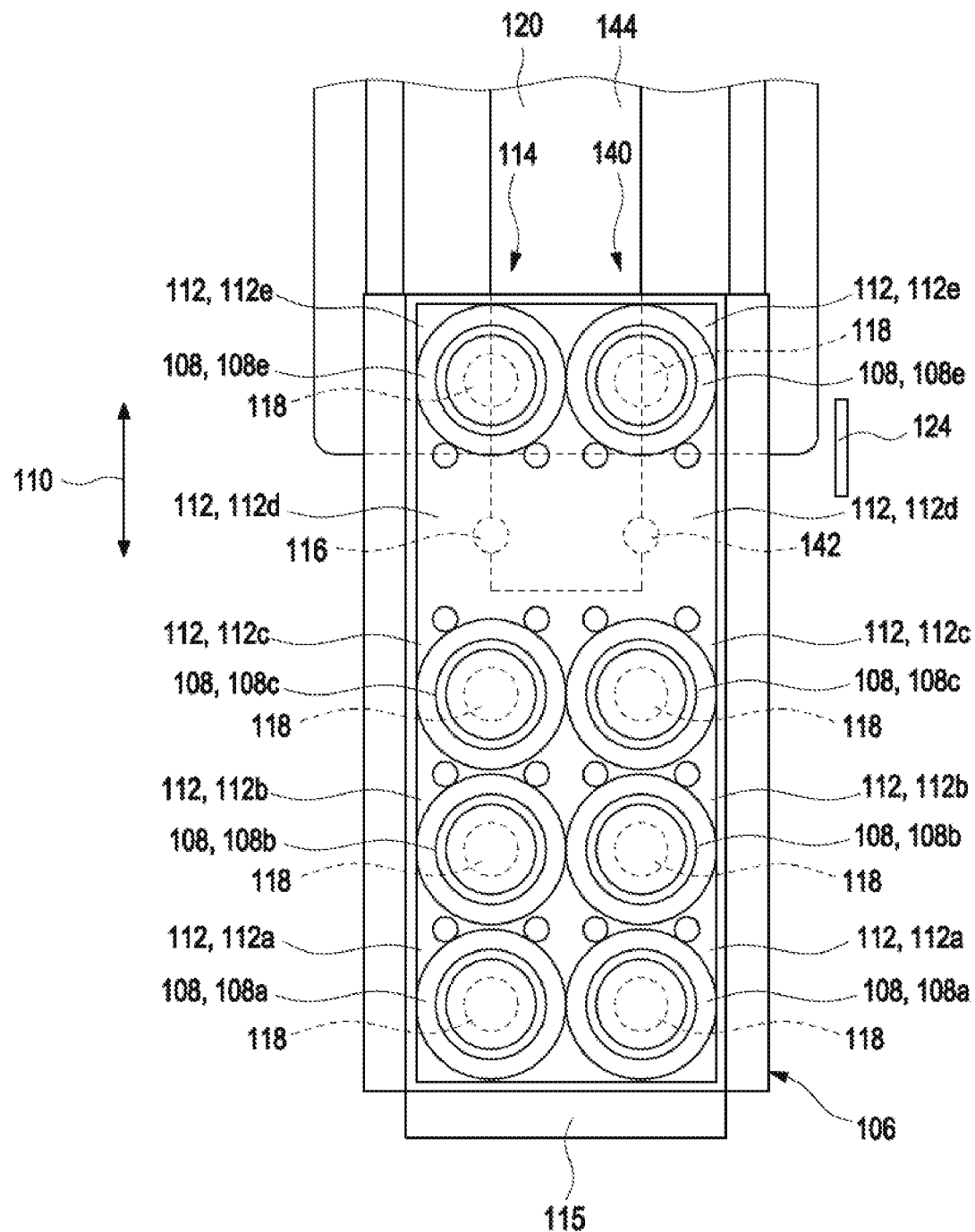
FIG. 18 shows a top view of the drawer in a fourth extended position in accordance with an embodiment of the present disclosure.

FIG. 18 shows a top view of the drawer 106 in a fourth extended position. Assuming that a fourth reagent vessel 108*d* disposed at the fourth arrangement position 112*d* of the first row 114 and/or the second row 140 has to be replaced, for example because of the reagent thereof has been consumed, the user pulls the drawer 106 and moves it from the retracted position as shown in FIG. 12 to the fourth extended position shown in FIG. 18 following the third extended position in the longitudinal direction 110 outwards from the housing 102. Concertedly or together with the movement of the drawer 106, the first slider 120 and the second slider 144 are moved into the slider extended position as shown in FIG.

14, which is proximal to the housing 102. Thereby, the first detector 116 and the second detector 142 are moved to the first detection position and the second detection position as they are mounted to the first slider 120 and the second slider 144. The movement of the drawer 106 is detected by the light barrier 124, which triggers the first detector 116 and/or the second detector 142. In the fourth extended position, the fourth reagent vessel 108d in the first row 114 and/or second row 140 may be taken out and replaced by a new fourth reagent vessel 108d. The first detector 116 and/or the second detector 142 identifies the new fourth reagent vessel 108d after being loaded into the drawer 106 at the fourth arrangement position 112d of the first row 114 and/or the second row 140 by reading the RFID tag 118 attached to the bottom surface thereof. Only if the new fourth reagent vessel 108d at the fourth arrangement position 112d of the first row 114 and/or the second row 140 contains the correct reagent, i.e., the reagent contained in the new fourth reagent vessel 108d corresponds to the target reagent associated with the fourth arrangement position 112d of the first row 114 and/or the second row 140, the user is allowed to move the drawer 106 back to the retracted position. As the first slider 120 and the second slider 144 are biased into the slider retracted position, the first slider 120 and the second slider 144 together with the drawer 106 move in the slider retracted position without requiring to be separately moved by the user. The first detector 116 and the second detector 142 can also be moved back into the housing 102 as they are mounted to the first slider 120 and the second slider 144. If the new fourth reagent vessel 108d at the fourth arrangement position 112d of the first row 114 and/or the second row 140 does not contain the correct reagent, the drawer 106 is blocked from being moved back into the retracted position as will be explained in further detail below.

Figure 19:
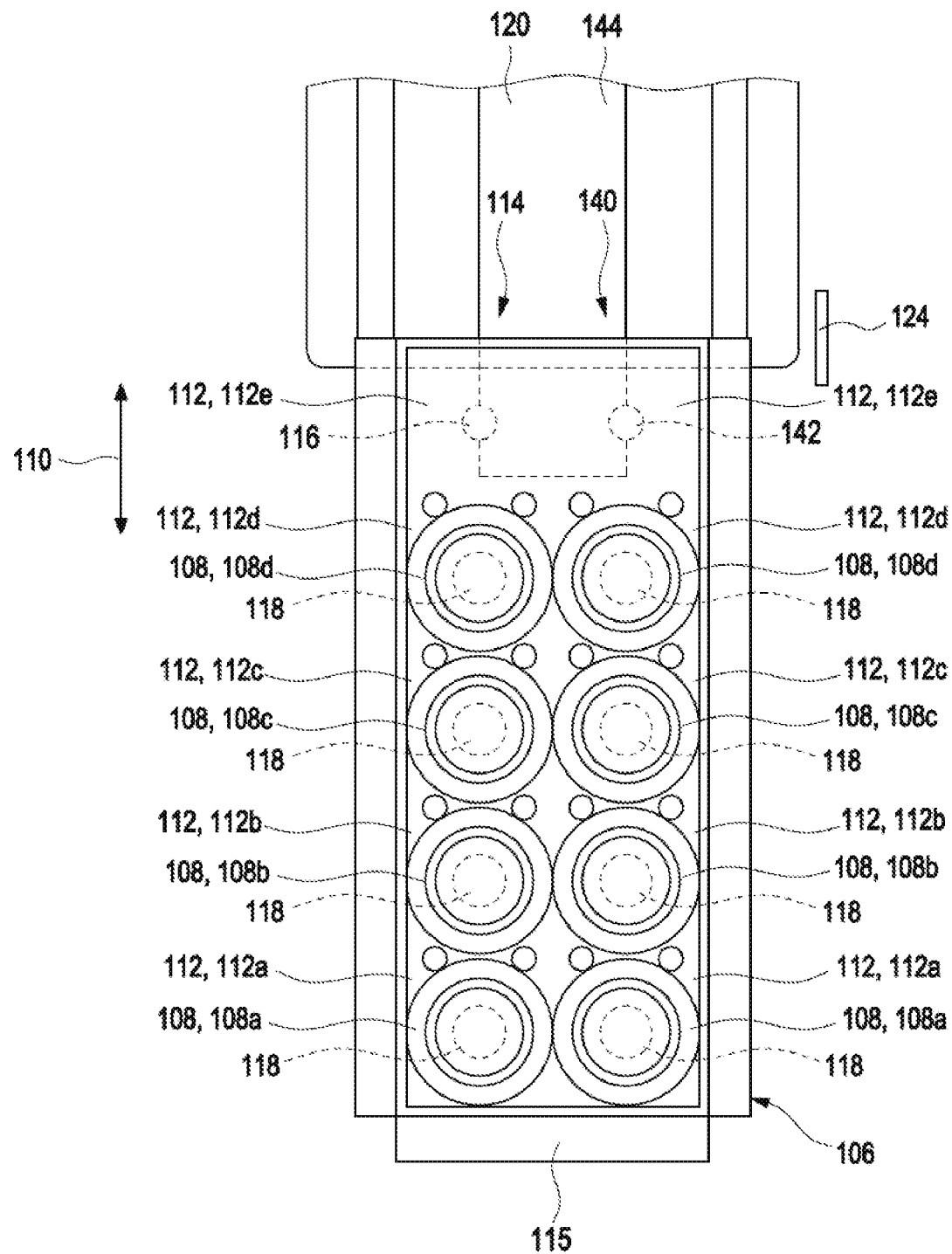
FIG. 19 shows a top view of the drawer in a fifth extended position in accordance with an embodiment of the present disclosure.

FIG. 19 shows a top view of the drawer 106 in a fifth extended position. Assuming that a fifth reagent vessel 108e disposed at the fifth arrangement position 112e of the first row 114 and/or the second row 140 has to be replaced, for example because of the reagent thereof has been consumed, the user pulls the drawer 106 and moves it from the retracted position as shown in FIG. 12 to the fifth extended position shown in FIG. 19 following the fourth extended position in the longitudinal direction 110 outwards from the housing 102. Concertedly or together with the movement of the drawer 106, the first slider 120 and the second slider 144 are moved into the slider extended position as shown in FIG. 14, which is proximal to the housing 102. Thereby, the first detector 116 and the second detector 142 are moved to the first detection position and the second detection position as they are mounted to the first slider 120 and the second slider 144, respectively. The movement of the drawer 106 is detected by the light barrier 124, which triggers the first detector 116 and/or the second detector 142. In the fifth extended position, the fifth reagent vessel 108e in the first row 114 or the second row 140 may be taken out and replaced by a new fifth reagent vessel 108e. The first detector 116 and/or the second detector 142 identifies the new fifth reagent vessel 108e after being loaded into the drawer 106 at the fifth arrangement position 112e of the first row 114 and/or the second row 140 by reading the RFID tag 118 attached to the bottom surface thereof. Only if the new fifth reagent vessel 108e at the fifth arrangement position 112e of the first row 114 and/or the second row 140 contains the correct reagent, i.e., the reagent contained in the new fifth reagent vessel 108e corresponds to the target reagent associated with the fifth arrangement position 112e of the first row 114 and/or the second row 140, the user is allowed to move the drawer 106 back to the retracted position. As the first slider 120 and the second slider 144 are biased into the slider retracted position, the first slider 120 and the second slider 144 together with the drawer 106 move in the slider retracted position without requiring to be separately moved by the user. The first detector 116 and the second slider 144 can also be moved back into the housing 102 as they mounted to the first slider 120 and the second slider 144, respectively. If the new fifth reagent vessel 108e at the fifth arrangement position 112e of the first row 114 and/or the second row 140 does not contain the correct reagent, the drawer 106 is blocked from being moved back into the retracted position as will be explained in further detail below.

Figure 20:
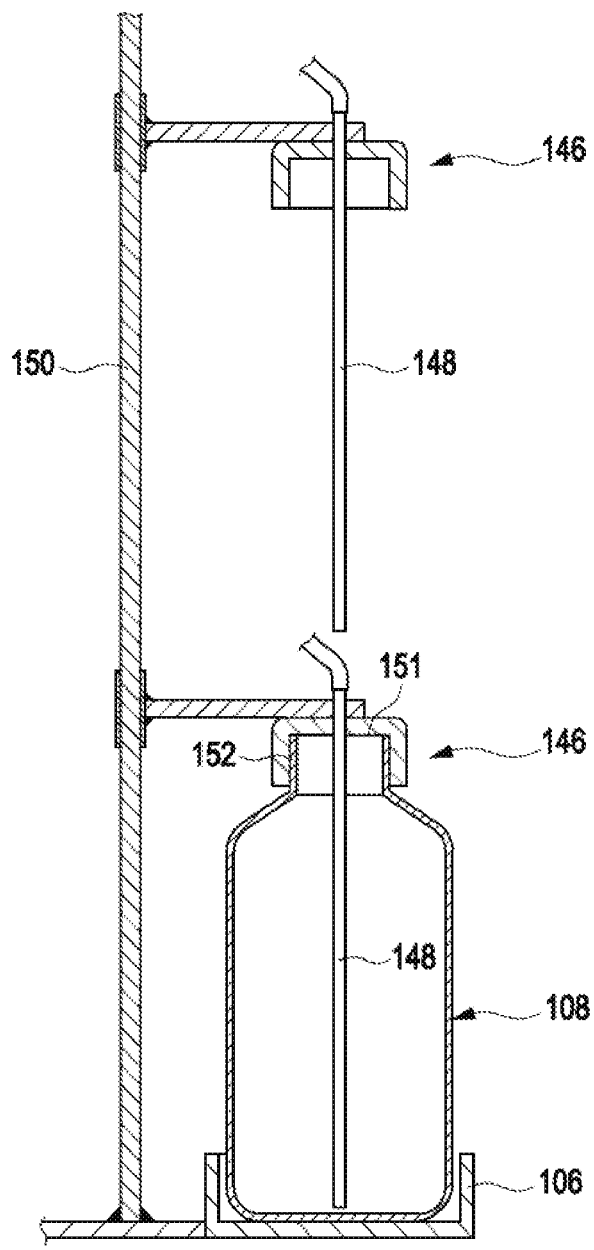
FIG. 20 shows a side view of a discharge device in accordance with an embodiment of the present disclosure.

FIG. 20 shows a side view of a discharge device 146. The discharge device 146 may be used with or part of the automatic analyzer 100 according to any one of the first to third embodiments. The discharge device 146 is configured to discharge reagent from the reagent vessels 108. With other words, there is a discharge device 146 per reagent vessel 108 such that each reagent vessel 108 has its own discharge device 146. Each of the discharge devices 146 comprises an immersion tube 148 configured to be immersed into a reagent vessel 108. According to the discharge device 146 of FIG. 20, the immersion tube 148 is formed straight. Further, the discharge device 146 is linearly moveable between an open position shown in the upper part of FIG. 20, in which the immersion tube 148 is retracted from a reagent vessel 108, and a closed position shown in the lower part of FIG. 20, in which the immersion tube 148 is immersed into the reagent vessel 108. For this purpose, the discharge device 146 may be raised and lowered along a guide rail 150 or the like. The immersion tube 148 is located so as to be centered with respect to a center point of an opening 151 at a neck 152 of the reagent vessel 108.

Figure 21:
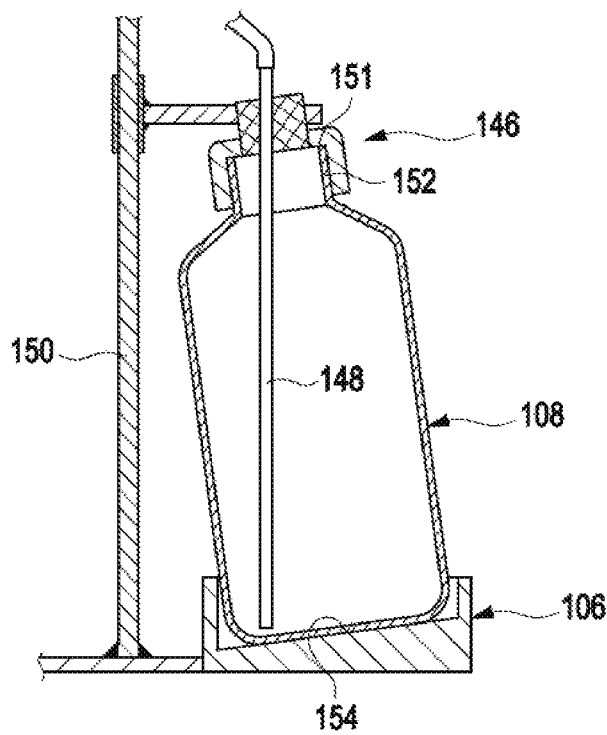
FIG. 21 shows a side view of a modification of the discharge device in accordance with an embodiment of the present disclosure.

FIG. 21 shows a side view of a modification of the discharge device 146 of FIG. 20. Hereinafter, only the differences from the discharge device 146 of FIG. 20 will be explained and identical or comparable constructional members and features are indicated by like reference numerals. The immersion tube 148 is located so as to be centered with respect to a center point of the opening 151 at the neck 152 of the reagent vessel 108. Further, the drawer 106 comprises an inclined inner surface 154 on which the reagent vessels 108 are loadable. Thereby, the dead space volume of the reagent vessels 108 may be reduced. It is explicitly stated that the discharge device 146 of FIG. 20 may also be used with a drawer having an inclined inner surface 154.

Figure 22:
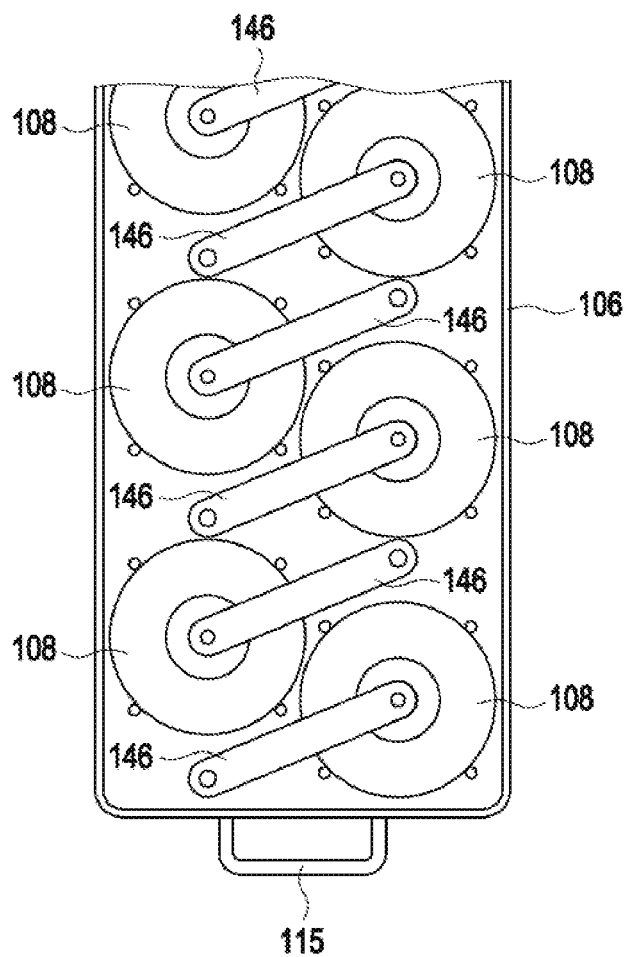
FIG. 22 shows a top view of another modification of the discharge device in accordance with an embodiment of the present disclosure.

FIG. 22 shows a top view of another modification of the discharge device 146 of FIG. 20. Hereinafter, only the differences from the discharge device 146 of FIG. 20 will be explained and identical or comparable constructional members and features are indicated by like reference numerals. The immersion tube 148 is located so as to be centered with respect to a center point of an opening 151 at a neck 152 of the reagent vessel 108. As shown in FIG. 22, the discharge device 146 are incline with respect to the longitudinal direction as the reagent vessels 108 of the first row and second row 140 are shifted relative to one another.

Figure 23:
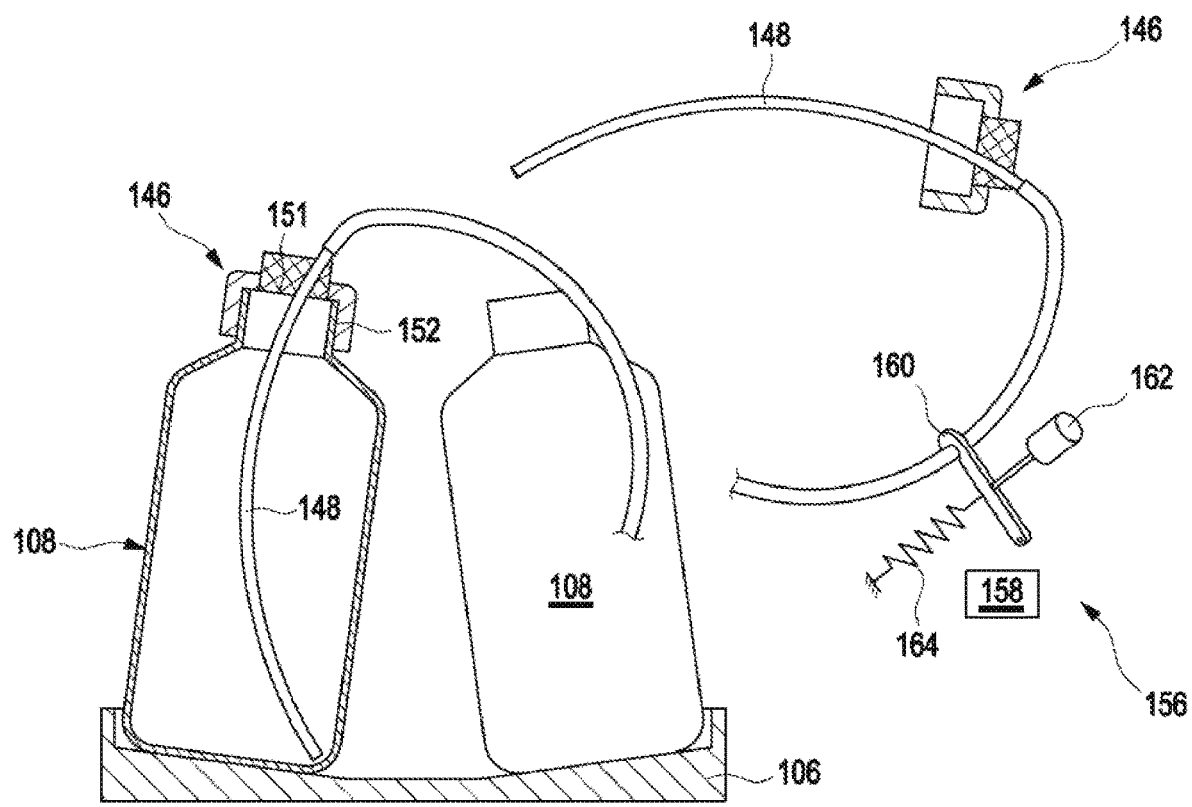
FIG. 23 shows a side view of another discharge device in accordance with an embodiment of the present disclosure.
Figure 24:
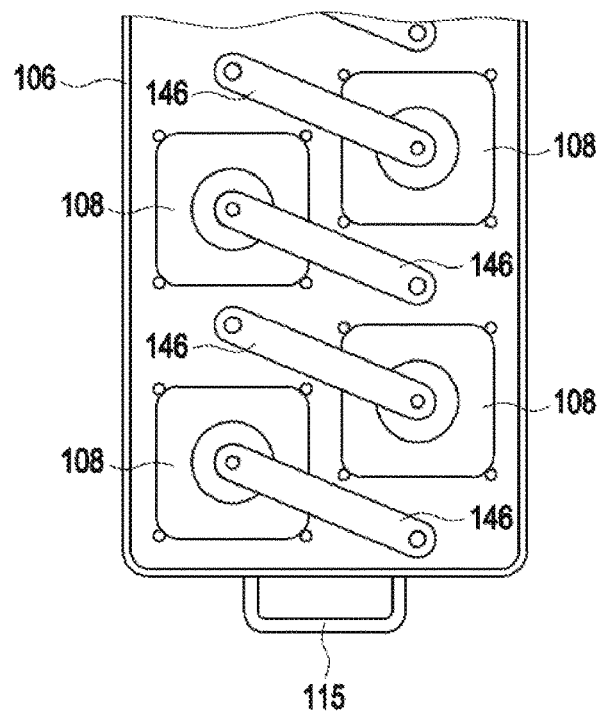
FIG. 24 shows a top view of the discharge device in accordance with an embodiment of the present disclosure.

FIG. 23 shows a side view of another discharge device 146. FIG. 24 shows a top view of the discharge device 146 of FIG. 23. Hereinafter, only the differences from the discharge device 146 of FIG. 20 will be explained and identical or comparable constructional members and features are indicated by like reference numerals. The immersion tube 148 is curved and the discharge device 146 is pivotally moveable between an open position as shown in the right part of FIG. 23, in which the immersion tube 148 is retracted from a reagent vessel 148, and a closed position as shown in the left part of FIG. 23, in which the immersion tube 148 is immersed into the reagent vessel 108.

Further, as shown in FIG. 23, the automatic analyzer 100 according to any of the embodiments described herein may further comprise a blocking device 156 configured to allow a reagent vessel 108 to be loaded into or to be unloaded from the drawer 106 exclusively in the first extended position of the drawer 106 proximal to the housing 102. The blocking device 156 is coupled to the discharge devices 146. Particularly, each discharge device 146 is associated with a separate blocking device 156. The blocking device 156 is configured to block a movement of the discharge devices 146 at least from the open position into the closed position if a wrong reagent vessel 108 is detected and to allow a movement of the discharge device 146 at least from the open position into the closed position if a correct reagent vessel 108 is detected. With other words, if the identified reagent vessel 108 does not correspond to the target reagent vessel 108 associated with a certain arrangement position 112, the discharge device 146 may not be moved into the closed position. Thus, the supply of a wrong reagent to the automatic analyzer 100 may be prevented. The automatic analyzer blocking device 156 may be configured to block a movement of the discharge device 146 at least from the closed position into the open position if an associated reagent vessel 108 is not completed discharged. Further, the blocking device 156 is configured to prevent a reagent vessel 108 to be loaded into or to be unloaded from the drawer 106 in any extended position except for the first extended position of the drawer 106 proximal to the housing 102. Particularly, the blocking device 156 is configured to block a movement of the discharge devices 146 associated with any extended position except for the first extended position at least from the closed position into the open position. According to the exemplary embodiment shown in FIG. 23, the blocking device comprises a sensor 158 configured to detect whether the discharge device 146 is in its open position or closed position. Further, the blocking device 156 comprises a pivotal hook 160 configured to selectively engage with the discharge device 146 so as to prevent a movement of the discharge device 146 or to allow a movement of the discharge device 146. Further, the blocking device 156 comprises a motor 162 and a spring 164 connected to the hook 162. The motor 162 is configured to move the spring 164 and the hook 162 as the spring 164 is connected to the hook 162. Thus, if the sensor 158 detects the open position of the discharge device 146, the motor 162 is driven to move the hook 162 to engage with the discharge device 146. Thereby, a movement of the discharge device 146 is blocked. If a correct reagent vessel 108 is identified by the first detector 116 and/or the second detector 142 after a replacement of a reagent vessel 108, the motor 162 is driven to move the hook 162 to disengage from the discharge device 146. Thereby, a movement of the discharge device 146 is allowed.

Figure 25:
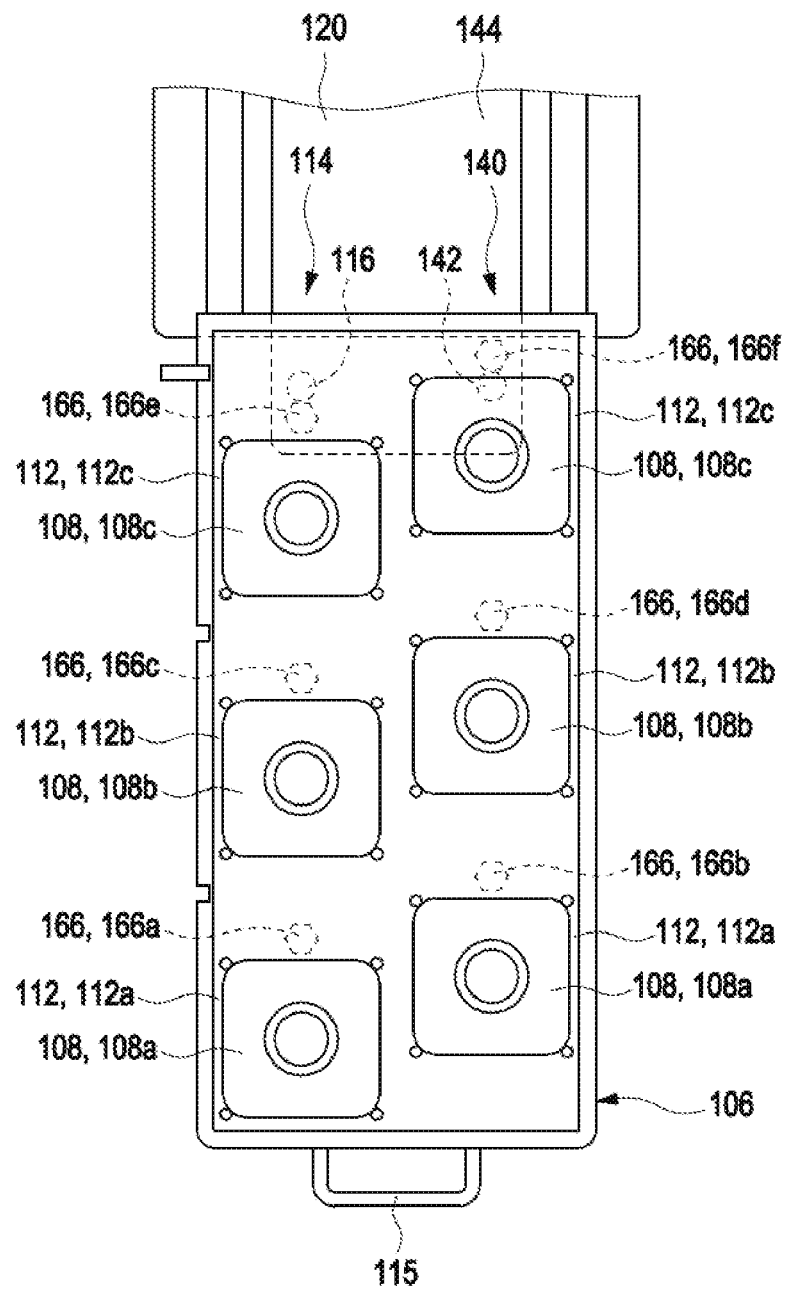
FIG. 25 shows a top view of a portion of a modification of the automatic analyzer in accordance with an embodiment of the present disclosure.

FIG. 25 shows a top view of a portion of a modification of the automatic analyzer 100 according to the third embodiment of the present disclosure. Hereinafter, only the differences from the automatic analyzer 100 according to third embodiment of the present disclosure will be explained and identical or comparable constructional members and features are indicated by like reference numerals. With the automatic analyzer 100 according to the modified third embodiment of the present disclosure, the arrangement positions 112 of the second row 140 are shifted relative to the arrangement positions of the first row 114 in the longitudinal direction 110. This shifted arrangement facilitates the arrangement of the discharge devices 146.

Further, position markers 166 are arranged between the arrangement positions 112 of the first row 114 and the second row 140. The position markers 166 are RFID tags. Merely as an example, six position markers 166 are shown which are identified as first position marker 166a to sixth position marker 166f. The first position marker 166a to sixth position marker 166f are alternating located between the arrangement positions 112 of the first row 114 and the second row 140. Thereby, the moving direction of the drawer 106 may be detected by means of the first detector 116 and the second detector 142. For example, if the third position marker 166c is detected by the first detector 142 before the fourth position marker 166d is detected by the second detector 142, then the drawer 106 is moved towards the retracted position and into the housing 102, respectively. For example, if the fourth position marker 166d is detected by the second detector 142 before the third position marker 166c is detected by the first detector 142, then the drawer 106 is moved towards the extended positions and out of the housing 102, respectively. If the drawer is not manually moveable but is moved by a motor or the like, then the control unit of the motor knows the moving direction and the position markers 166 may be omitted. Further, the detection of the position markers may be carried out by other detectors than the first and second detectors 116, 142.

Regarding the above described embodiments, it has to be noted that the first detector 116 and/or the second detector 142 are described as being configured to detect the position of the drawer 106 in the above manner. It is explicitly stated that other devices or methods may be applied to detect the position of the drawer 106. For example, two or more light barriers may be used. Further examples are a linear position transducer or encoder, a rotary position transducer or encoder having a drive with a gear wheel and a gear rack or the like which is configured to convert a linear movement into a rotary movement. In addition or alternatively, a further sensor such as a further RFID detector may be used. These devices may be used in connection with a strong halts, particularly latches, or soft halts and sensor(s) and/or light barrier(s) allowing an exact detection of the position of the drawer 106.

For example, an applicable principle using strong halts for avoiding intermediate positions between the extended positions of the drawer is that a first detector identifies the vessels and a second detector detects position markers. Both detectors may be arranged in parallel or shifted relative to one another in a parallel direction. The detector for detecting the position of the drawer may be arranged within the housing of the analyzer 100 and may be stationary if the position markers such as RFID tags are shifted relative to the RFID tags of the reagent vessels 108. Such a shifted arrangement for the position markers would allow a greater distance between the RFID tags of the reagent vessels 108 and the position markers in order to avoid a detection of the wrong tag or marker. The position markers may use a data structure different from the one of the RFID tags on the reagent vessels 108. Such different data structures may be omitted in case the specified distance is more than 30 mm as RFID detectors including an electric field strength detection function may differ between the position markers and the RFID tags on the reagent vessels 108.

An exemplary operation of an automatic analyzer using a light barrier for the detection of the drawer position is that the light barrier sends a trigger signal "drawer in position". Then, the RFID detector for detecting the position of the drawer is operated. Further, the RFID reader(s) for detecting the RFID tags on the reagent vessel is/are operated. Then, it is checked whether the reagent vessel may be replaced. If the check reveals that the reagent vessel is allowed to be replaced, then the immersion tube is allowed to rise. If the check reveals that the reagent vessel is not allowed to be replaced, then the user of the analyzer is correspondingly informed such as by means of information on the display device. After replacement of the reagent vessel, which has to be confirmed by the user, the RFID tag of the reagent vessel is read. If the reading reveals that the correct reagent vessel is at the target position thereof, then the immersion tube is allowed to be lowered. If the reading reveals that an incorrect reagent vessel is at the detection position, then the immersion tube is not allowed to be lowered and the user of the analyzer is correspondingly informed such as by means of information on the display device.

An exemplary operation of an automatic analyzer without using a light barrier for the detection of the drawer position is that a sensor or switch sends a signal at least indicating that the drawer is extended. Then, the RFID detector for detecting the position of the drawer is operated. If a new extended position of the drawer is present, then the RFID reader(s) for detecting the RFID tags on the reagent vessel is/are operated. Further, it is checked whether the reagent vessel may be replaced. If the check reveals that the reagent vessel is allowed to be replaced, then the immersion tube is allowed to rise. If the check reveals that the reagent vessel is not allowed to be replaced, then the user of the analyzer is correspondingly informed such as by means of information on the display device. After replacement of the reagent vessel, which has to be confirmed by the user, the RFID tag of the reagent vessel is read. If the reading reveals that the correct reagent vessel is at the target position thereof, then the immersion tube is allowed to be lowered. If the reading reveals that an incorrect reagent vessel is at the detection position, then the immersion tube is not allowed to be lowered and the user of the analyzer is correspondingly informed such as by means of information on the display device.

It is explicitly stated that the identification of a reagent vessels by means of the RFID tag attached thereon and the detection of the position of the drawer by means of RFID tags serving as position marker may be carried out by a single RFID reader in parallel provided the RFID reader is operated in the so called addressed mode. Thus, this parallel reading of two different RFID tags only requires a corresponding configuration of the operation mode of the RFID reader. Particularly, the RFID reader moving together with the drawer to the slider extender position may read in each of the drawer positions one of the RFID tags serving as position marker as well as a RFID tag of a reagent vessel provided a reagent vessel is present in the respective extended position of the drawer. The detection of the drawer position requires a sensor confirming that the slider is in the slider extended position. If there are two or more rows of reagent vessels, only one of the RFID readers associated with the rows needs to detect the respective drawer position. With this modification, the drawer is associated with a separate RFID for each drawer extended position.

LIST OF REFERENCE NUMBERS 100 automatic analyzer
102 housing
104 analytical instrument
106 drawer
108 reagent vessel
110 longitudinal direction
112 arrangement position
114 first row
115 handle
116 first detector
118 RFID tag
120 first slider
122 spring
124 light barrier
126 display device
128 side wall
130 opening
132 stopper
134 rear end
136 front edge
140 second row
142 second detector
144 second slider
146 discharge device
148 immersion tube
150 guide rail
151 opening
152 neck
154 inner surface
156 blocking device
158 sensor
160 hook
162 motor
164 spring
166 position marker

What is claimed is:

1. An automatic analyzer for analyzing samples, comprising:
   a housing at least partially enclosing at least one analyzing instrument,
   a drawer configured to be loaded with a plurality of reagent vessels, wherein the drawer is moveable in a longitudinal direction relative to the housing between a retracted position, in which the drawer is retracted in the housing, and extended positions, in which the drawer is extended from the housing, wherein the drawer defines arrangement positions for the reagent vessels at least in a first row parallel to the longitudinal direction, and
   a first detector associated with the first row and configured to identify the reagent vessels at a first detection position when arranged in the first row, and
   wherein the automatic analyzer further comprises a first slider, wherein the first detector is mounted to the first slider, wherein the first slider is moveable between a slider retracted position, in which the first slider is retracted in the housing, and a slider extended position, in which the first slider is extended from the housing.

2. The automatic analyzer according to claim 1, wherein the first detector is triggered by a sensor, a switch, or a light barrier coupled to the housing when the first slider is moved to the slider extended position or when a reagent vessel is loaded into the drawer in the first row or when a reagent vessel is unloaded from the first row of the drawer.

3. The automatic analyzer according to claim 2, wherein the slider extended position overlaps with the first detection position.

4. The automatic analyzer according to claim 1, further comprising a position sensor coupled to the housing and configured to detect a position of the drawer.

5. The automatic analyzer according to claim 1, wherein the first detector is configured to detect a position of the drawer and/or wherein the first detector is configured to detect a moving direction of the drawer.

6. The automatic analyzer according to claim 5, wherein the first detector is configured to detect the moving direction of the drawer by means of position markers arranged between the arrangement positions.

7. The automatic analyzer according to claim 1, wherein the first detector is arranged below or laterally next to the drawer.

8. The automatic analyzer according to claim 1, further comprising a display device configured to display at least one of the following detection results from the first detector: no reagent vessel at an arrangement position defined by the first detection position, a wrong reagent vessel at an arrangement position defined by the first detection position, and a correct reagent vessel at an arrangement position defined by the first detection position.

9. The automatic analyzer according to claim 1, wherein the drawer further defines arrangement positions for the reagent vessels at least in a second row parallel to the longitudinal direction, wherein the automatic analyzer further comprises a second detector associated with the second row and configured to identify the reagent vessels at a second detection position when arranged in the second row.

10. The automatic analyzer according to claim 1, further comprising a second slider, wherein the second detector is mounted to the second slider, wherein the second slider is moveable between a slider retracted position, in which the second slider is retracted in the housing, and a slider extended position, in which the second slider is extended from the housing.

11. The automatic analyzer according to claim 9, wherein the second detector is configured to detect a position of the drawer and/or wherein the second detector is configured to detect a moving direction of the drawer.

12. The automatic analyzer according to claim 10, wherein the second detector is triggered by a sensor, a switch, or a light barrier coupled to the housing when the second slider is moved to the slider extended position or when a reagent vessel is loaded into the drawer in the second row or when a reagent vessel is unloaded from the second row of the drawer.

13. The automatic analyzer according to claim 1, further comprising discharge devices configured to discharge reagent from the reagent vessels, wherein each of the discharge devices comprises an immersion tube configured to be immersed into a reagent vessel, wherein the immersion tube is formed straight and the discharge device is linearly moveable between an open position, in which the immersion tube is retracted from a reagent vessel, and a closed position, in which the immersion tube is immersed into the reagent vessel or wherein the immersion tube is curved and the discharge device is pivotally moveable between an open position, in which the immersion tube is retracted from a reagent vessel, and a closed position, in which the immersion tube is immersed into the reagent vessel.

14. The automatic analyzer according to claim 1, further comprising a blocking device configured to allow a reagent vessel to be loaded into or to be unloaded from the drawer exclusively in a first extended position of the drawer, wherein the blocking device is configured to block a movement of the discharge devices at least from the open position into the closed position if a wrong reagent vessel is detected and to allow a movement of the discharge device at least from the open position into the closed position if a correct reagent vessel is detected, and/or wherein the blocking device is configured to block a movement of the discharge device at least from the closed position into the open position if an associated reagent vessel is not completed discharged and/or wherein the blocking device configured to prevent a reagent vessel to be loaded into or to be unloaded from the drawer in any extended position except for the first extended position of the drawer and/or wherein the blocking device is configured to block a movement of the discharge devices associated with any extended position except for the first extended position at least from the closed position into the open position.

* * * * *